US009942403B2

(12) United States Patent
Williams et al.

(10) Patent No.: US 9,942,403 B2
(45) Date of Patent: *Apr. 10, 2018

(54) COMMUNICATION SYSTEM FOR DETERMINING QUEUE USING CONTEXTUAL DATA

(71) Applicant: Virtual Hold Technology, LLC, Akron, OH (US)

(72) Inventors: Mark J. Williams, North Canton, OH (US); Eric I. Camulli, Copley, OH (US); Larry Miner, Bath, OH (US); Rob Brazier, Akron, OH (US)

(73) Assignee: Virtual Hold Technology, LLC, Akron, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/199,945

(22) Filed: Jun. 30, 2016

(65) Prior Publication Data
US 2016/0373582 A1 Dec. 22, 2016

Related U.S. Application Data

(60) Division of application No. 13/446,923, filed on Apr. 13, 2012, now Pat. No. 9,386,155, which is a (Continued)

(51) Int. Cl.
*H04M 3/48* (2006.01)
*H04M 3/523* (2006.01)
(Continued)

(52) U.S. Cl.
CPC .......... *H04M 3/5231* (2013.01); *G06Q 10/02* (2013.01); *H04L 63/08* (2013.01);
(Continued)

(58) Field of Classification Search
CPC ........... H04M 3/5238; H04M 2207/18; H04M 3/5158; H04M 2203/60; G06Q 10/02; H04L 63/08

See application file for complete search history.

(56) References Cited

U.S. PATENT DOCUMENTS 5,627,884 A 5/1997 Williams et al.
5,692,033 A 11/1997 Farris
(Continued)

FOREIGN PATENT DOCUMENTS

EP 587950 3/1994
KR 10-2003-0056994 7/2003
(Continued)

OTHER PUBLICATIONS

U.S. Appl. No. 15/210,720—Apr. 6, 2017 PTO Office Action.
(Continued)

*Primary Examiner* — Harry S Hong
(74) *Attorney, Agent, or Firm* — Aldo Noto; Davidson Berquist Jackson & Gowdey LLP

(57) ABSTRACT

A communication device is provided for enabling a user to establish an automated call back from a communication system, such as a call center, for example. A software device application enables the communication device to communicate with the call center through the exchange of data. The communication device includes a display screen for displaying controls for allowing the user to interact with the communication system. The controls allow the user to request a list of providers from which to select a provider or company to contact. The communication device further provides controls for allowing the user to select a queue to join from a list of queues associated with the selected provider. An embodiment of a system and method for managing, directing, and queuing communication events
(Continued)

may also communicate contextual data between a communication device and a communication system.

24 Claims, 17 Drawing Sheets

Related U.S. Application Data continuation-in-part of application No. 12/320,517, filed on Jan. 28, 2009, now Pat. No. 8,213,911.

(51) Int. Cl.
*G06Q 10/02* (2012.01)
*H04L 29/06* (2006.01)
*H04M 3/51* (2006.01)

(52) U.S. Cl.
CPC ....... *H04M 3/5158* (2013.01); *H04M 3/5232* (2013.01); *H04M 3/5238* (2013.01); *H04M 2203/60* (2013.01); *H04M 2207/18* (2013.01)

(56) References Cited

U.S. PATENT DOCUMENTS

| | | | |
|---|---|---|---|
| 6,064,730 A | 5/2000 | Ginsberg | |
| 6,192,050 B1 | 2/2001 | Stovall | |
| 6,405,049 B2 | 6/2002 | Herrod et al. | |
| 6,535,601 B1 | 3/2003 | Flockhart et al. | |
| 6,563,921 B1 | 5/2003 | Williams et al. | |
| 6,879,683 B1 | 4/2005 | Fain et al. | |
| 7,068,775 B1 | 6/2006 | Lee | |
| 7,426,267 B1 | 9/2008 | Caseau | |
| 7,746,999 B2 | 6/2010 | Williams et al. | |
| 7,787,610 B1 | 8/2010 | Williams et al. | |
| 8,010,706 B1 | 8/2011 | Rein et al. | |
| 8,112,069 B2 | 2/2012 | Williams et al. | |
| 8,150,023 B2 | 4/2012 | Williams et al. | |
| 8,213,911 B2 | 7/2012 | Williams et al. | |
| 8,223,956 B2 | 7/2012 | Williams et al. | |
| 8,229,101 B1 | 7/2012 | Williams | |
| 8,256,922 B2 | 9/2012 | Futami | |
| 8,589,673 B2 | 11/2013 | Ackerly | |
| 9,082,143 B1 | 7/2015 | Cleary | |
| 9,386,155 B2* | 7/2016 | Williams | G06Q 10/02 |
| 2002/0007295 A1 | 1/2002 | Kenny et al. | |
| 2002/0065759 A1* | 5/2002 | Boies | G06Q 30/02 |
| | | | 705/37 |
| 2002/0193119 A1 | 10/2002 | Goss et al. | |
| 2003/0012558 A1 | 1/2003 | Kim et al. | |
| 2003/0061078 A1 | 3/2003 | Shimosako et al. | |
| 2003/0093167 A1 | 5/2003 | Sim | |
| 2003/0133558 A1 | 7/2003 | Kung et al. | |
| 2003/0195753 A1 | 10/2003 | Homuth | |
| 2003/0235287 A1 | 10/2003 | Margolis | |
| 2004/0097287 A1 | 5/2004 | Postrel | |
| 2004/0196856 A1 | 10/2004 | Bondarenko et al. | |
| 2005/0018849 A1 | 1/2005 | Rodriguez et al. | |
| 2005/0093986 A1 | 5/2005 | Shinohara et al. | |
| 2005/0175167 A1 | 8/2005 | Yacoub et al. | |
| 2005/0233733 A1* | 10/2005 | Roundtree | G06F 9/45512 |
| | | | 455/414.1 |
| 2006/0012810 A1 | 1/2006 | Postle et al. | |
| 2006/0111941 A1 | 5/2006 | Blom | |
| 2006/0143058 A1 | 6/2006 | Brunet | |
| 2006/0182243 A1 | 8/2006 | Yun | |
| 2006/0258397 A1 | 11/2006 | Kaplan et al. | |
| 2006/0265286 A1 | 11/2006 | Evangelist et al. | |
| 2006/0277550 A1 | 12/2006 | Williams et al. | |
| 2007/0086585 A1* | 4/2007 | Dorricott | H04M 3/5191 |
| | | | 379/265.01 |
| 2007/0116230 A1 | 5/2007 | Brandt et al. | |
| 2007/0160076 A1 | 7/2007 | Faber et al. | |
| 2007/0274495 A1* | 11/2007 | Youd | H04M 3/5231 |
| | | | 379/210.01 |
| 2008/0063180 A1 | 3/2008 | Barsness et al. | |
| 2008/0144827 A1* | 6/2008 | Davis | H04K 1/00 |
| | | | 380/270 |
| 2008/0195456 A1 | 8/2008 | Fitzpatrick et al. | |
| 2008/0238610 A1 | 10/2008 | Rosenberg | |
| 2008/0317058 A1 | 10/2008 | Williams | |
| 2009/0074166 A1 | 3/2009 | Pavlic et al. | |
| 2009/0119599 A1 | 5/2009 | Hazen | |
| 2010/0008265 A1 | 1/2010 | Freer | |
| 2010/0189250 A1 | 7/2010 | Williams et al. | |
| 2010/0190476 A1 | 7/2010 | Williams et al. | |
| 2010/0190477 A1 | 7/2010 | Williams et al. | |
| 2011/0184646 A1 | 7/2011 | Wong et al. | |
| 2011/0313923 A1 | 10/2011 | Votaw et al. | |
| 2011/0288962 A1 | 11/2011 | Rankin et al. | |
| 2012/0085829 A1 | 4/2012 | Ziegler | |
| 2012/0150565 A1 | 6/2012 | Gordon et al. | |
| 2012/0170728 A1 | 7/2012 | Wengrovitz et al. | |
| 2012/0196578 A1 | 8/2012 | Williams et al. | |
| 2012/0288075 A1 | 11/2012 | Williams et al. | |
| 2012/0295596 A1 | 11/2012 | Camulli et al. | |
| 2013/0053002 A1 | 2/2013 | Hymes | |

FOREIGN PATENT DOCUMENTS

| | | |
|---|---|---|
| KR | 10-2004-0104097 | 12/2004 |
| KR | 10-0612440 | 8/2006 |
| KR | 10-0765967 | 10/2007 |
| WO | WO2000-44159 | 7/2000 |
| WO | WO2004-081720 | 9/2004 |
| WO | WO2010-087966 | 8/2010 |
| WO | WO2010-087967 | 8/2010 |

OTHER PUBLICATIONS

CA Appln. No. 2,750,942—Office Action dated Feb. 4, 2016.
CA Appln. No. 2,750,942—Office Action dated Nov. 22, 2016.
EP Appln. No. 10736139.6—Office Action dated Jun. 28, 2012.
EP Appln. No. 10736140.4—Office Action dated Jul. 12, 2016.
EP Appln. No. 10736140.4—Office Action dated Jun. 28, 2012.
International Search Report dated Oct. 12, 2010, in related foreign application under the WIPO, Application No. PCT/US2010/000239.
International Search Report dated Sep. 18, 2010, in related foreign application under the WIPO, Application No. PCT/US2010/000238.
U.S. Appl. No. 13/619,629—filed Sep. 7, 2016 PTO Office Action.
UK Appln. No. 1306668.3—Search Report and Examination Opinion dated Jul. 24, 2013.

* cited by examiner

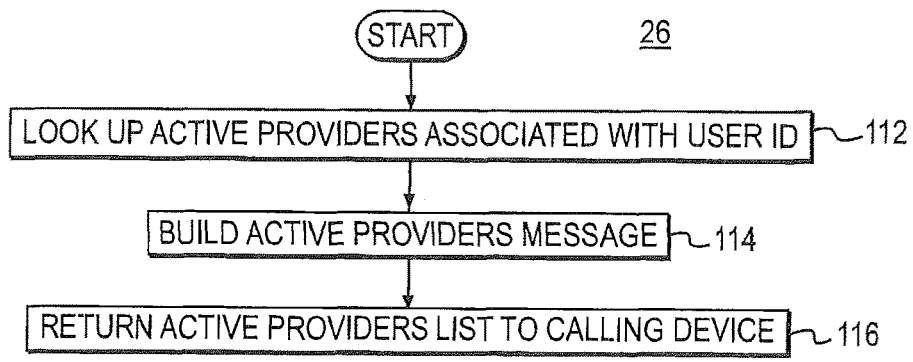
FIG. 8A
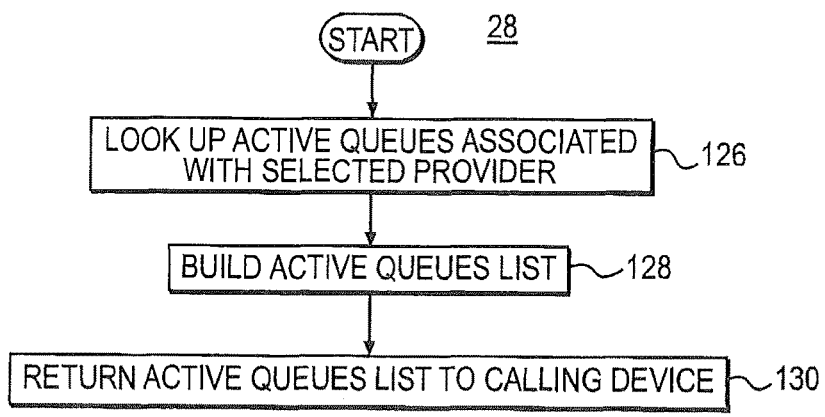
FIG. 8B
FIG. 8C

| COMPANY ID 212 | ACTIVE QUEUES 214 |
|---|---|
| COMPANY A | SERVICE OUTAGE, NEW SERVICE, BILLING, OTHER |
| COMPANY B | CHECKING/SAVING, CREDIT CARD, MORTGAGES, OTHER |
| COMPANY C | NEW RESERVATION, EXISTING RESERVATION, ACCOUNT, OTHER |
| COMPANY D | SERVICE A, SERVICE, B, SERVICE C, OTHER |
*FIG. 8D*
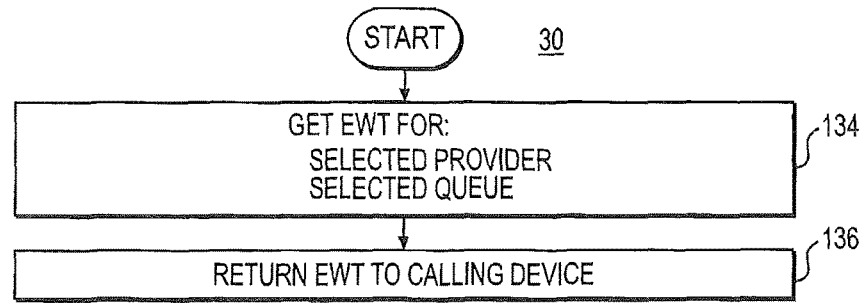
*FIG. 8E*
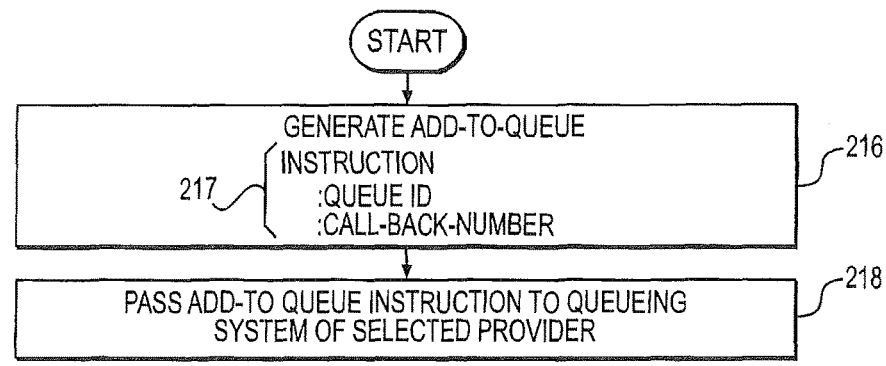
*FIG. 8F*

COMMUNICATION SYSTEM FOR DETERMINING QUEUE USING CONTEXTUAL DATA

RELATED APPLICATION

This application is a division of U.S. application Ser. No. 13/446,923, filed on Apr. 13, 2012, entitled "COMMUNICATION DEVICE FOR ESTABLISHING AUTOMATED CALL BACK USING QUEUES," which is a continuation-in-part application of U.S. application Ser. No. 12/320,517, filed on Jan. 28, 2009, entitled "A MOBILE COMMUNICATION DEVICE FOR ESTABLISHING AUTOMATED CALL BACK," which are hereby incorporated by reference herein in their entirety.

TECHNICAL FIELD

The systems and methods relate to managing the queuing of clients waiting to be connected by telephone to a service agent of a business communication center. More particularly, the systems and methods relate to enabling clients to be added to a queue utilizing web service messaging and relate to establishing a telephony connection between clients and service agents on an automated basis and in an order maintained by a queue.

BACKGROUND

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representatives ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts. Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exacerbating, it does not address the inconvenience of having to navigate an irritatingly slow and usually complicated voice prompt menu to enter the queue.

Therefore, what is needed is: i) a method and system for adding clients to a queue in a more convenient manner; and ii) a method and system for establishing a telephony connection between the client and the service agents in an automated fashion.

SUMMARY

In an embodiment, a method for a communication system that receives incoming communications from a communication device, has queues, and will call-back to a communication receiving device is used. The method includes receiving data from the communication device (where the data includes an identifier associated with a communication receiving device) and determining, from the received data, a queue desired for the identifier, where the queue is a service agent queue. The method further includes (a) determining the expected wait time in the queue, (b) sending information to the communication device, where the information includes the expected wait time in the queue, and (c) assigning a placeholder for the identifier in the queue. If a call back request is received from the communication device, the method includes initiating a call back to the communication receiving device based upon the assigned placeholder in the queue and placing an outgoing telephone call to the communication receiving device.

Also, a method for use in a system that receives incoming communications from a communication device and will queue a call back is described.

In an embodiment, a communication system for receiving incoming communications from communication devices and for initiating a call-back includes a sequence component that initiates a call-back sequence to a communication receiving device. In this embodiment, the sequence component is in communication with a communication device and, based on the communication, the sequence component determines a queue and confirms a call back. The system further includes a queue component having more than one queue, where a placeholder is assigned for an identifier associated with the communication receiving device in the determined queue. The system also includes an expected wait time component for determining the expected wait time in the determined queue. The expected wait time is provided to the sequence component and the sequence component communicates information regarding the expected wait time to the communication device. The system of this embodiment further includes a call-back component for placing an outgoing call to the communication receiving device, where the sequence component prompts the call back component to place the outgoing call.

In addition, a computer-readable medium including instructions for initiating a call-back sequence is described.

In an embodiment, a communication device for initiating a call-back sequence includes a display screen, a processor for executing a device application and a memory for storing the device application. The device application includes a queue control, where the queue control displays, on the screen, an indication of a queue and obtains a user selection of the queue as a selected queue. The device application further includes an expected wait time client, where a sequence component sends an expected wait time services call and receives an indication of the expected wait time, and where the expected wait time services call includes identification of the selected queue. The device application also includes a confirmation control to display, on the screen, the indication of the expected wait time where a user selection of one of a confirmation command and a cancel command is obtained. The device application includes a confirmation wait time client that generates a confirmation services call to the sequence component in response to user selection of the confirmation command, the confirmation services call includes at least a communication receiving device identifier and an instruction to add the communication device identifier to the selected queue.

A computer readable medium including instructions for a communication device to initiate a call-back sequence in a communication system is also described.

In addition to requesting an expected wait time and callback from the communication system, an embodiment of a system and method for managing, directing, and queuing communication events may also communicate contextual data between a communication device and a communication system using, for example, a contextual data routine.

BRIEF DESCRIPTION OF THE DRAWINGS

FIG. 8A is a flow chart representing exemplary operation of an active providers service or method in accordance with an exemplary embodiment of the present invention;

FIG. 8B is an exemplary active providers data storage in accordance with an exemplary embodiment of the present invention;

FIG. 8C is a flow chart representing exemplary operation of an active queues service or method in accordance with an exemplary embodiment of the present invention;

FIG. 8D is an exemplary active queues data storage in accordance with an exemplary embodiment of the present invention;

FIG. 8E is a flow chart representing exemplary operation of an expected wait time service or method in accordance with an exemplary embodiment of the present invention;

FIG. 8F is a flow chart representing exemplary operation of an ad-to-queue method in accordance with an exemplary embodiment of the present invention;

DETAILED DESCRIPTION

Figure 1A:
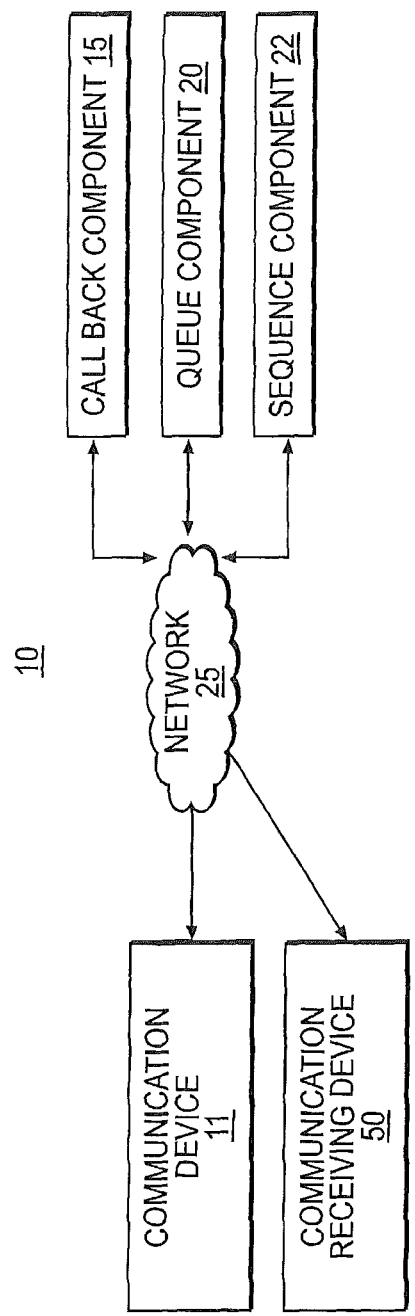
FIG. 1A is a block diagram representing an exemplary architecture of a system for sequencing communication devices in a selected queue of a selected provider.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that the table structures represented in this application are exemplary only and intended to show the mapping of relationships between various data elements. Other table structures may store similar data elements in various manners. Further, the applicant's use of the term "plurality" is intended to indicate not just "at least one", but one, two, three, or any other quantity. The applicant's use of the term "group" is intended to indicate not just "at least one", but two, three, or more of the items within the group.

FIG. 1A is a high level schematic illustration of a system 10 for placing a communication device 11 in a queue and calling a communication receiving device 50. The system 10 includes the communication device 11, a network 25, a call back component 15, a queue component 20, a sequence component 22, and the communication receiving device 50.

The system 10 assigns a placeholder for a communication device 11 (or an identifier for a communication device 11 such as its telephone number or other unique network identifier) in a selected queue (not shown in FIG. 1) of the queue component 20. The system uses a sequence component 22 to execute a call back sequence to a communication receiving device 50. When prompted, the call back component 15 places an outgoing call to a communication receiving device 50. The outgoing call attempts to establish a voice connection with the communication receiving device 50.

The communication receiving device 50 may be any device that can receive a telephone call. The communication receiving device 50 is often the communication device 11 that sent the initial data requesting a telephone connection.

In some embodiments, prior to allowing communication between a communication device 11 and the system 10, the system 10 performs one or more security checks. These security checks can be performed for a variety of purposes including to ensure that the software on the communication device 11 is authentic and valid for use on the device and that the device is authorized. Various software routines may be used by the system 10 and the communication device 11 to perform security checks. Encryption keys may be assigned to the communication devices 11 and used for the security check.

In an embodiment, the identifier for a communication device 11 is an encryption key. Each software application for communicating with the system 10 on a communication device 11 may have one or more unique encryption keys that are recognized by the system 10.

The network 25 (depicted by a cloud) can be any one or more of a variety of networks. The system 10 shown can support many communication devices 11 of various types and many queues (not shown in FIG. 1). The communication device 11 may communicate with the other components through the network using available techniques.

The communication device 11 may be a mobile communication device using cell phone, wi-fi, satellite or other mobile communication technology. The communication device may take the form of any mobile device such as a cellular telephone, a tablet, or a laptop. The communication device 11 may also be a non-mobile device, such as a home entertainment device, a kiosk, a computer, or a point of purchase device, as shown in FIGS. 1B-1D.

Figure 1B:
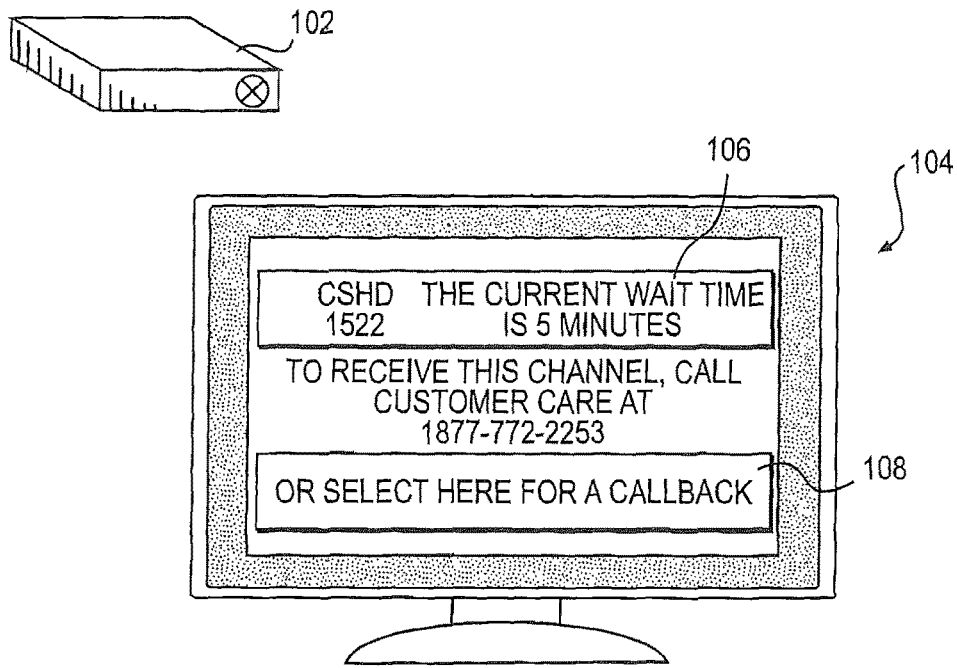
FIG. 1B illustrates an embodiment of the system that uses a home entertainment device to initiate a telephone connection and/or callback.

FIG. 1B illustrates an embodiment of the system 10 that uses a home entertainment device 102 (e.g., a set top box, a television, a cable box, a gaming console, a digital video disk (DVD) player or some combination) to initiate a telephone connection and/or callback. In the embodiment shown in FIG. 1B, the communication device 11 is a home entertainment device 102. The home entertainment device 102 is typically connected to a display 104. The display 104 is used to show queues, phone numbers, company names, a companies services departments or the like. The display 104 may display a number to call in order to receive a particular program or to access a particular channel from a cable company, for example. The display 104 may display an expected wait time 106. The display 104 may also display a box 108 that allows a user to select and enter a phone number for a callback. After the expected wait time (or an approximately equivalent time) has passed, the system 10 places an outgoing call to a communication receiving device (not shown) having the phone number provided by the user. The home entertainment device 102 may optionally include a remote control (not shown) to navigate callback menus that provide a list of queues and their expected wait time, if any exist. Other user interface devices and software can be used with the home entertainment system.

Figure 1C:
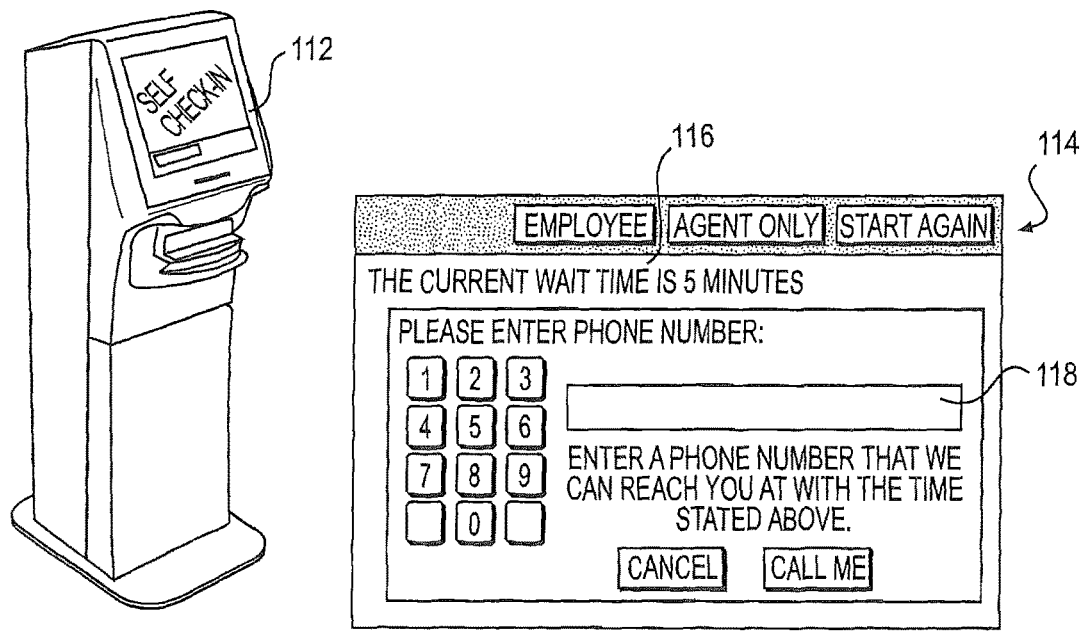
FIG. 1C illustrates an embodiment of the system that uses a kiosk, e.g., a boarding pass kiosk at an airport, to initiate a telephone connection and/or callback.

FIG. 1C illustrates an embodiment of the system 10 that uses a kiosk 112, e.g., a boarding pass kiosk at an airport, to initiate a telephone connection and/or callback. In this embodiment, the communication device 11 is the kiosk 112. The kiosk 112 typically includes a display 114 that shows an expected wait time 116 for a requested telephone connection. The display 114 may also display a box 118 that allows a user to enter a phone number for a callback. After the expected wait time (or an approximately equivalent time) has passed, the system 10 places an outgoing call to a communication receiving device (not shown) having the phone number provided by the user.

Figure 1D:
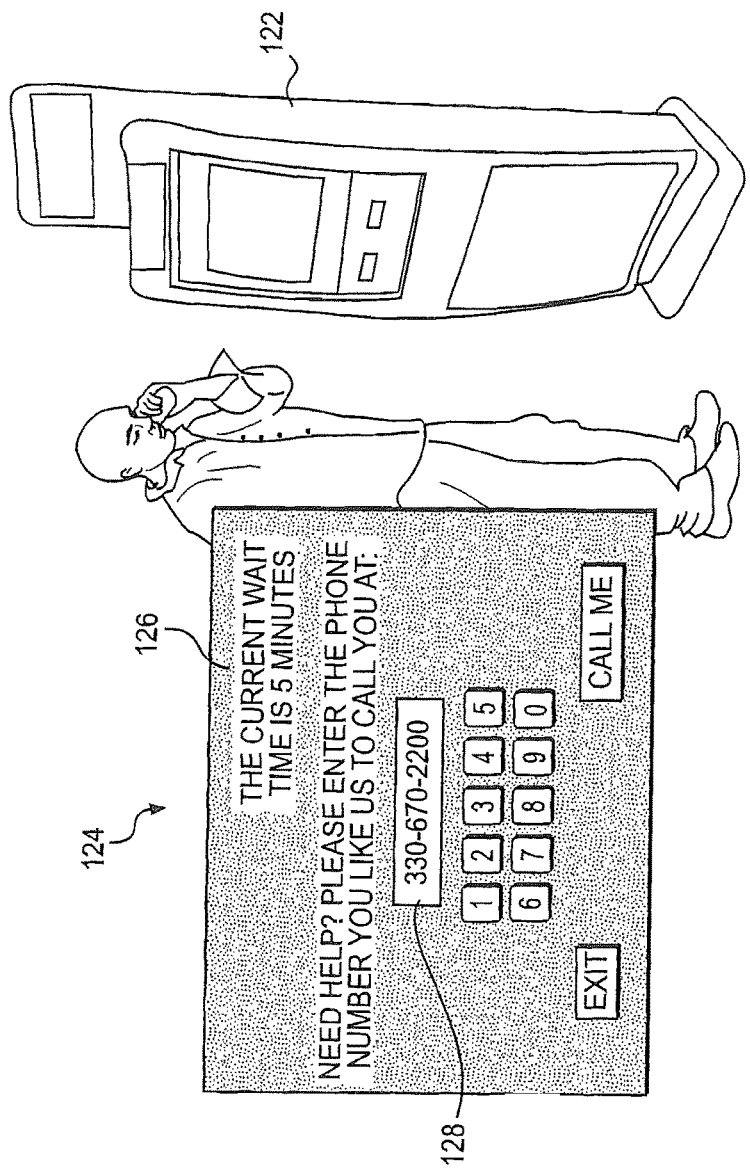
FIG. 1D illustrates an embodiment of the system that uses a point of purchase device to initiate a telephone connection and/or callback.

FIG. 1D illustrates an embodiment of the system 10 in which the communication device 11 is the point of purchase device 112. The point of purchase device 122 may take various forms e.g., a cell phone plan purchase device. In this embodiment, the point of purchase device 122 is used to initiate a telephone connection and/or callback. The point of purchase device 122 typically includes a display 124 that shows an expected wait time 126 for a requested telephone connection. The display 124 may also display a box 128 that allows a user to enter a phone number available for a callback. After the expected wait time (or an approximately equivalent time) has passed, the system 10 places an outgoing call to a communication receiving device (not shown) having the phone number provided by the user. Alternatively, a microphone and speaker may be provided at the point of purchase location or on the point of purchase device 122.

Figure 2:
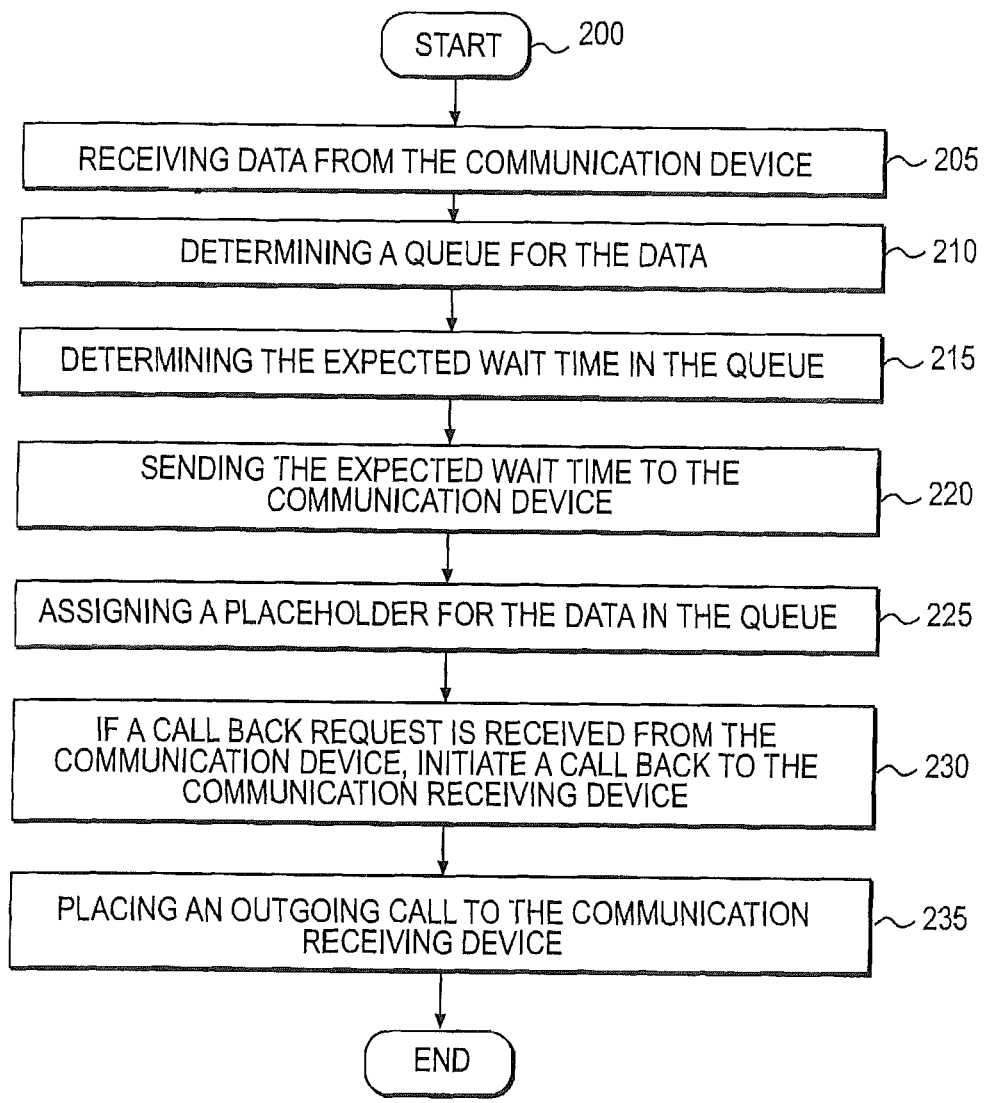
FIG. 2 is a flow-chart of a method for call back sequencing.

Referring now to FIG. 2, shown is a flow chart of an exemplary embodiment of a method for initiating a call-back sequence in a communication system, such as a call center or contact center, for example. The method 200 includes receiving data from a communication device 11 (205), determining a queue for the data (210), determining the expected wait time in the queue (215) for the data and sending the expected wait time in the queue to a communication device 11 (220). The method further includes assigning a placeholder for the data in the queue (225). If a call back request is received from the communication device 11, the method includes initiating a call back to a communication receiving device 50. The method further includes placing an outgoing call to a communication receiving device 50 (235). The steps of the method may be performed in various different orders or chronology.

As noted above, the communication receiving device 50 may be any device that can receive a telephone call. The communication receiving device 50 is often the communication device 11 that sent the initial data requesting a telephone connection.

Figure 3A:
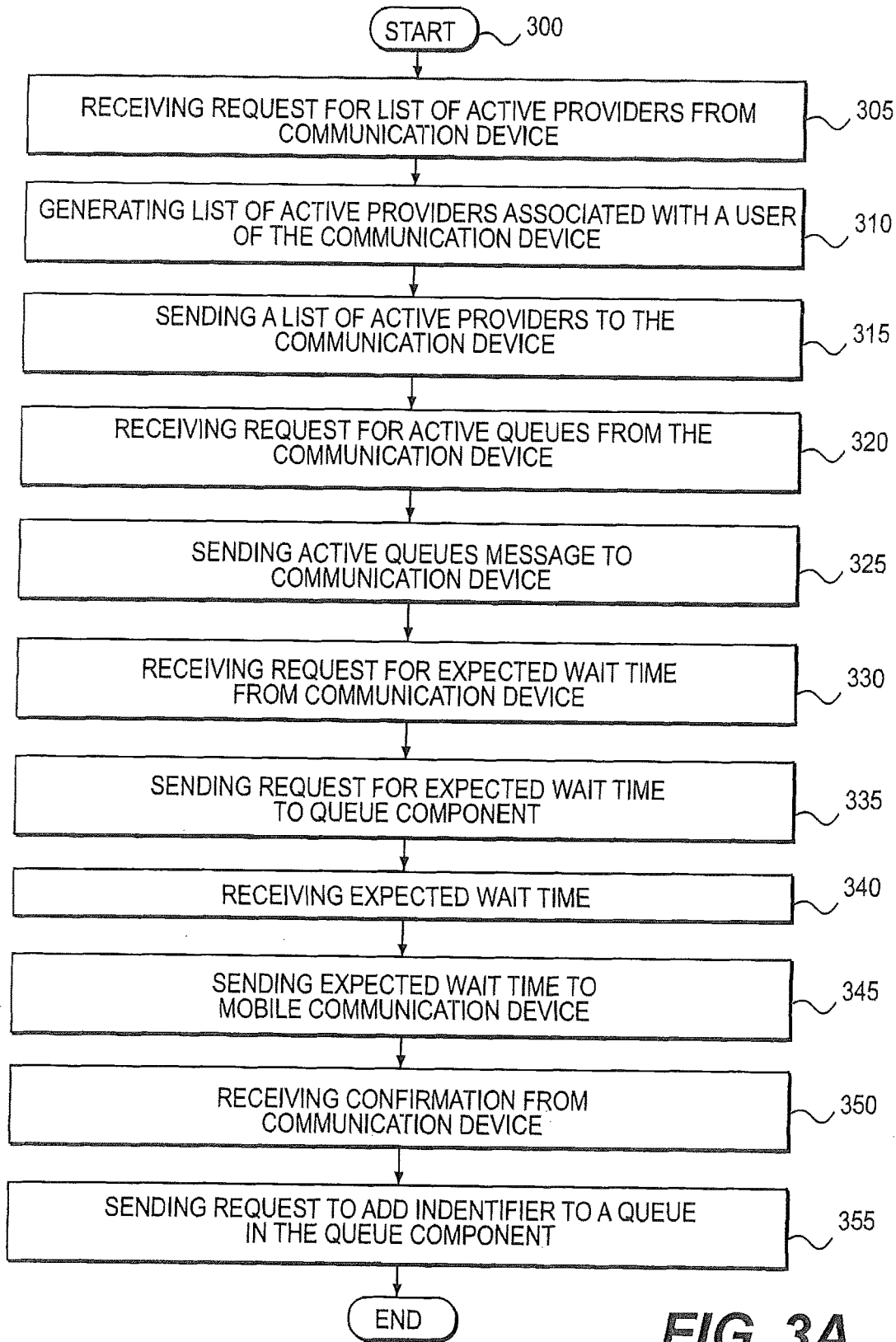
FIG. 3A is a flow-chart of a method for assigning a placeholder in a queue for a call back to a communication device.

FIG. 3A is a flow chart of an embodiment of a method 300 for assigning a placeholder in a queue for a call back to a communication device 11 in a communication system. The description of the method 300 in FIG. 3A also references components and routines found in FIG. 3B. The method 300 of FIG. 3A includes the sequence component 22 receiving a request for a list of active providers from a communication device 11. This may be in the form of an active provider remote processing call 48 from a provider client routine 34 (305). The provider client 34 is a routine which is part of the session queuing component 24. The active provider remote processing call 48 originates from the communication device 11 and serves as the request for a list of active providers. The active providers may be associated with a user of the communication device 11. Upon receipt of the active provider remote processing call 48, the sequence component 22 launches an active provider routine 26. The routine generates a list of active providers associated with the user (310) of the communication device 11.

The method 300 further includes active provider routine 26 sending a list of active providers to the communication device 11 via an active providers message 50. More particularly, the provider client routine 34 in the session queuing component 24 receives active providers message 50 (315).

The method 300 further includes receiving a request for active queues in the queue component 20 via an active queue remote processing call 52 from the communication device 11 (320). The active queue remote processing call 52 serves as a request for a listing of active queues associated with the selected provider to an active queue routine or process 28 of the sequence component 22. The listing is populated into the service control 40 of the session queuing component 24.

The exemplary method 300 of FIG. 3A further includes sending active queues, via an active queues message 54, from active queue routine 28 to service client routine 38. The service client routine 38 in this example is resident on the communication device 11 (325). The active queues message 54 includes active queues wherein an identifier of a communication device 11 may be placed.

The method 300 further includes receiving a request for the expected wait time for receiving a call back from a provider. The expected wait time may be received via an expected wait time call 56 from the communication device 11 (330). Upon the user selecting a queue using the service control 40, the expected wait time client 42 generates an expected wait time call 56 to the sequence component 22. The method 300 includes the expected wait time routine 30 sending a request 62 for the expected wait time to the expected wait time component 18 (within the queue component 20) (335) and receiving the expected wait time 64 (340) from the expected wait time component 18.

With continuing reference to FIG. 3A, the method 300 further includes sending an expected wait time message 58 to the communication device 11 (345). More particularly, the expected wait time message 58 is sent from the expected wait time routine 30, of the sequence component 22, to an expected wait time client 42 of the session queuing component 24. The method 300 further includes receiving a confirmation call 60 from the communication device 11. More particularly, the confirmation call originates from confirmation client 46 (part of the session queuing component 24) and is sent to the confirmation routine 32 (350) of the sequence component 22. The method 300 further includes sending a request via a message 66 to the queue component 20 to add user's identifier to the selected queue (355).

Figure 3B:
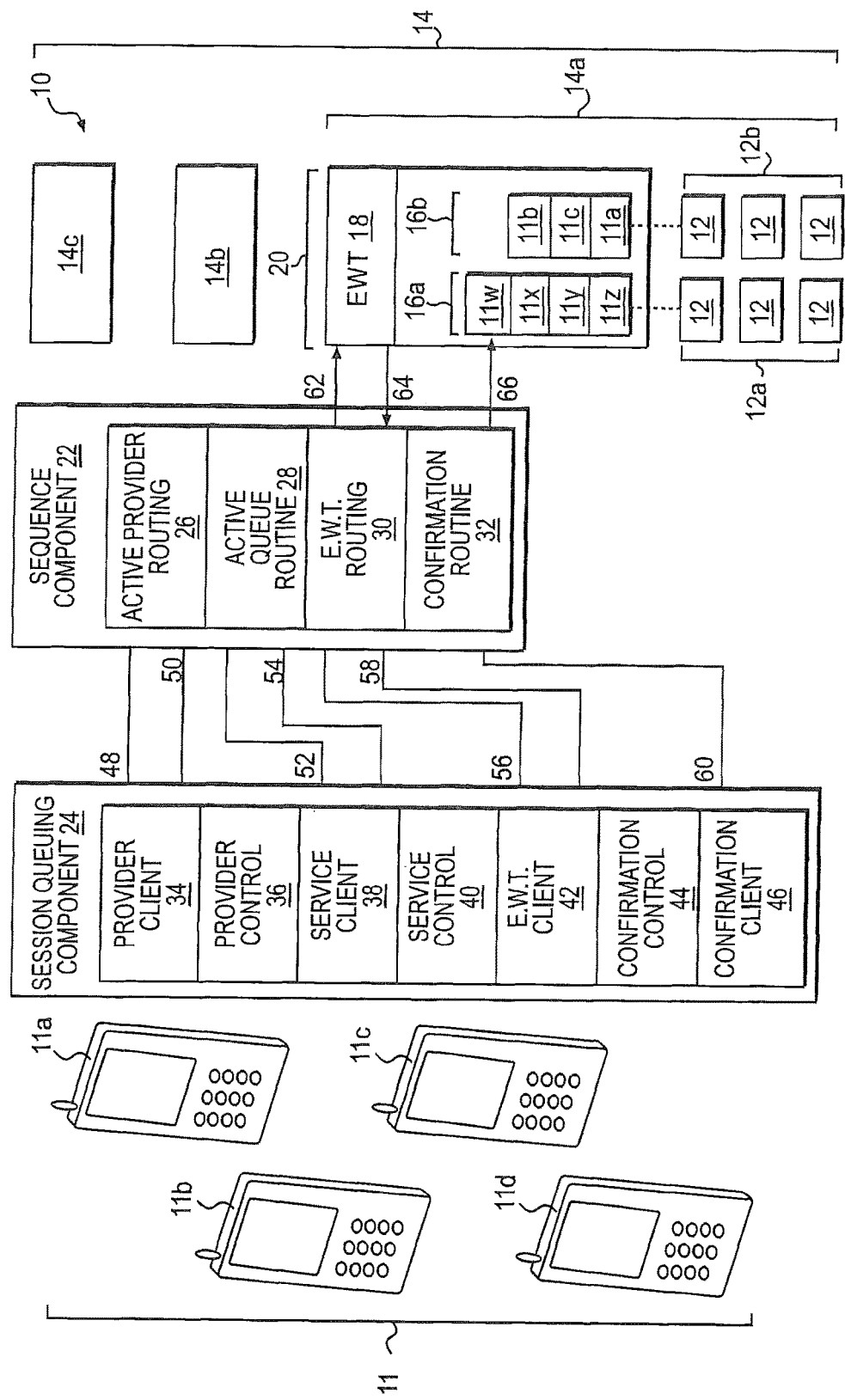
FIG. 3B is a block diagram representing an exemplary architecture of a system for sequencing communication devices in a selected queue of a selected provider.

FIG. 3B is a schematic diagram of an embodiment of a telephone based system 10 showing multiple communication devices 11a-11d and multiple business communication centers 14a-14c. Each business communication center 14a-14c is typically associated with a company for which the business communication center 14a-14c is operated. The system 10 includes sequence component 22 and a session queuing component 24. The sequence component 22 performs the call back sequencing of the communication devices 11a-11d. The session queuing component 24 resides within a communication device 11 and can be loaded onto each communication device 11a-11d.

With continuing reference to FIG. 3B, each business communication center (using business communication center 14a for reference) may be associated with a company and comprise a group of service agents 12. Each of the service agents 12 may be a service representative system for enabling a service representative to service a client. More specifically, the service representative may participate in an audio session with a communication device 11 and service the requests of each client, or routine, of the session queuing component 24. The service agents 12 may be organized in a single service agent set grouped into multiple service agent sets based on the skill set of service agent operators (e.g., the operators of the service agents 12 at a communication system).

In an embodiment, the business communication center 14a has at least one computer system including a processor operating the queue component 20, and memory. In general, the queue component 20 is adapted to maintain a group of queues 16a, 16b with each queue 16a, 16b being associated with one of sets 12a, 12b of the group of service agents 12. For example the set of service agents 12a may be associated with queue 16a while the second set of service agents 12b may be associated with queue 16b.

In an embodiment, the queue component 20 identifies a sequential order of the devices 11w, 11x, 11y, and 11z, which are queued for connection to one of the service agents 12.

Expected wait time component 18 is adapted to determine an expected wait time value representing the time at which service agents 12 within the particular service agent group are expected to be available to service a client. The expected wait time can be calculated or determined in a number of different ways.

The expected wait time value may represent an estimated wait time calculated using primary estimated wait time techniques such as projecting a wait time based on the quantity of clients in the queue and any of a historical, present, or projected time allotment for handling each such queued client. Alternatively, the expected wait time value may be a function of both a primary estimated wait time calculation and a wait time augmentation calculation made based on service agent availability and/or scheduled change in service agent availability as disclosed in co-pending patent application Ser. No. 11/143,857 filed on Jun. 2, 2005 and assigned to the same assignee as the present invention. Such patent application is incorporated herein by reference.

The sequence component 22 may be embodied as a web services server. In one embodiment, the sequence component is connected to the internet and includes appropriate web services messaging systems (i.e., Simple Object Access Protocol or SOAP) for communicating with the session queuing component 24 on the devices 11a-11d. In an embodiment, the sequence component 22 communicates with queue component 20.

The sequence component 22 may include a processor (not shown) for executing the web services messaging systems as well as other applications stored on a memory (not shown). Such other applications may comprise an active provider routine 26, an active queue routine 28, an expected wait time routine 30, and a confirmation routine 32.

The session queuing component 24 may include a number of routines including for example, a provider client 34, a company or provider control 36, a queue or service client 38, a queue or service control 40, an expected wait time client 42, a confirmation control 44 and a confirmation client 46.

It should be appreciated that each of the routines of the session queuing component 24 are exemplary and for illustrative purposes. Those skilled in the art will recognize that the systems and functions of each routine described herein may be implemented by way of other permutations of components and sub systems.

In an embodiment, the session queuing component 24 may be an embedded application of a communication device 11. In another embodiment, the session queuing component may be a java script, ActiveX, or other similar structure downloaded and executed by a browser and an applicable browser plug-in executing on the telephone 11. In this embodiment, the session queuing component 24 may include a combination of the java script or ActiveX control and components of the browser and/or the plug-in, which in combination drive operation of the session queuing component 24.

In an embodiment, the session queuing component 24 communicates with the sequence component 22 using web service messages and internet protocol. In an embodiment, the session queuing component 24 obtains user selection of a provider (from a group of providers) with which the user desires to communicate via a telephone communication session. The session queuing component 24 may also obtain user selection of a service of the selected provider (from a group of services) and an estimated wait time representing a duration of time the user can be expected to wait until connecting to the selected services. Session queuing component 24 confirms, after presenting the expected wait time to the user, that the user desires to connect to a service agent 12. More specifically, it confirms that the user wishes to speak with a particular type of service agent 12. The session queuing component 24 assists in placing the user in a queue for the user to receive a call back from the service agent 12 at a connection time.

The connection time may be when the user reaches the first position in the queue (i.e., after other clients in the selected queue prior to the client have all been connected to available service agents or abandoned their position in the queue selected) and a service agent becomes available, or at a specific scheduled time. The specific scheduled time may be a time calculated by adding the expected wait time to the time at which the expected wait time was presented to the user. The specific scheduled time may also be a time selected by the user.

The term "provider" is used interchangeably with the term "business communication center" or the "provider's business communication center" within this application, and the term "queue" is used interchangeably with the term "service" or the "queue for connection to a service agent providing the selected service."

Figure 4:
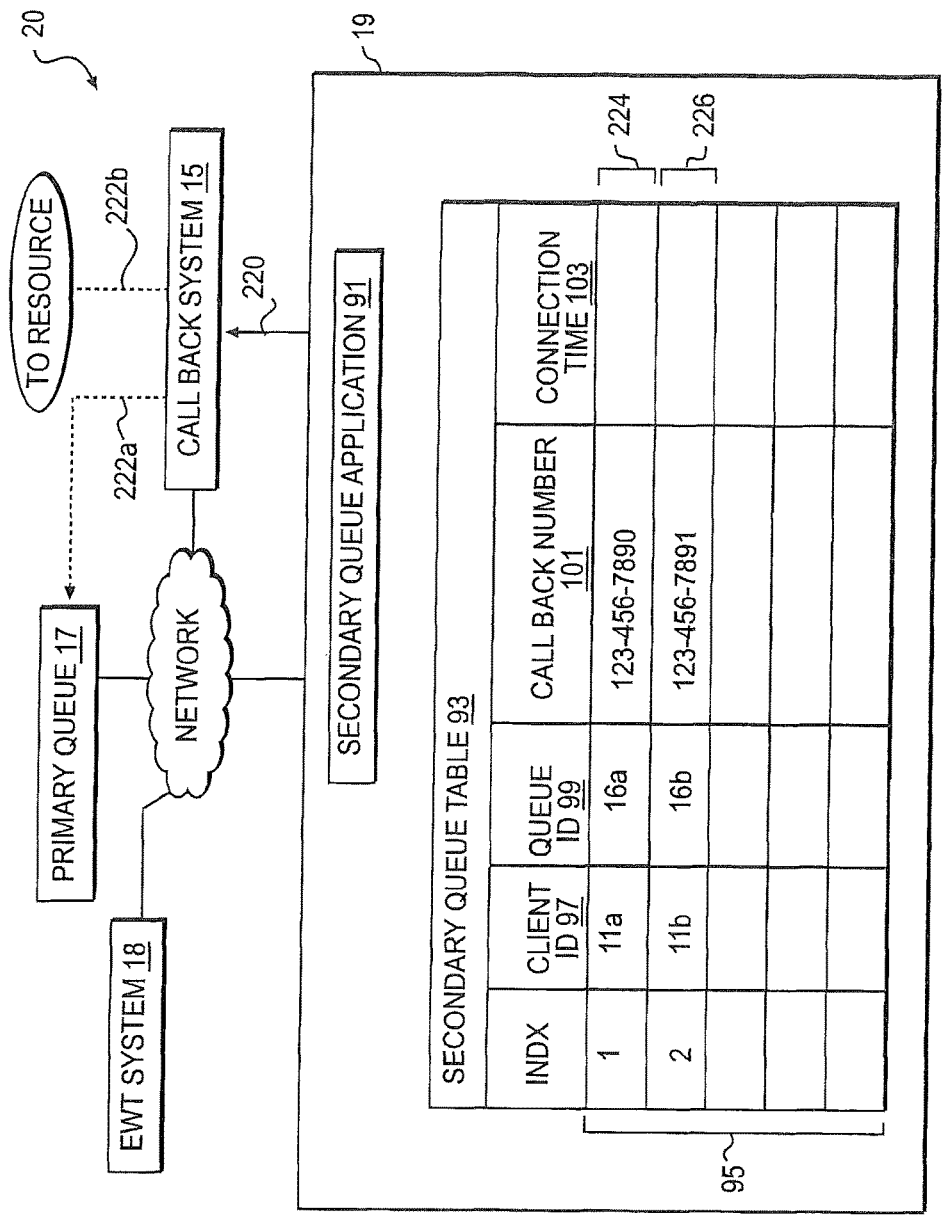
FIG. 4 is a block diagram of an exemplary queue component.

FIG. 4, is a block diagram of an embodiment of queue component 20. The queue component 20 may include primary queue 17 (ACD) adapted to queue communication devices 11 while maintaining the telephony connection (e.g., communication devices "on-hold"), a secondary queue component 19, a call back component 15 adapted to establish a telephony connection to communication device 11 for which a telephony connection is not maintained by the primary queue 17, and an expected wait time component 18.

The primary queue 17 may be embodied in a primary automated call director (ACD). In an embodiment, the ACD places in a queue client telephone connections which are "on-hold" waiting for a service agent 12. Such an ACD may use known technology adapted to (1) receive incoming calls from the communication device 11 (e.g., establishing a client connection with each) (2) identify which group of service agents the caller desires to connect (including using primary voice prompts) and (3) place the call in a queue for connection to the identified service agent group. If one of the service agents 12 within a service agent group becomes available, the ACD connects a next client connection from the queue to the available service agent 12.

The secondary queue component 19 may be coupled to a primary queue 17 as an accessory device. The secondary queue component 19 maintains the queue position of the communication device 11 in a manner that does not require the communication device 11 to remain "on hold" or otherwise maintain an active telephone connection with the primary queue 17. More specifically, for a communication device 11 calling the communication center utilizing the primary queue 17, the secondary queue component 19 may (1) obtain a network address for the communication device 11 (e.g., a telephone network call back telephone number or other telephone network address) and (2) write the network address of the telephone connection to a record of the queuing table (for example record 224 in the event a user of communication device 11a calls the communication center in a primary manner). Further, the secondary queue component 19 may, at the appropriate connection time, (3) induce the call back system 15 to establish a connection to the communication device 11 utilizing the call back number. Inducing the call back system 15 to establish the connection may include generating a call back message 220 to the call back system 15.

The secondary queue component 19 may also (e.g., communication devices 11 being added to a queue utilizing telephone system 10), obtain a network address of a telephone connection to the communication device 11 (e.g., a telephone network call back telephone number or other telephone network address) via the messaging discussed above with respect to messages 62, 64, and 66 in FIG. 3B. The secondary queue component 19 may write the network address of the telephone connection to a record of the queuing table (for example record 226 in the event a user of communication device 11b utilizing system 10 for being added to queue 16a), and at the appropriate connection time, induce the call back system 15 to establish a connection to a communication device 11 utilizing the call back number. Inducing the call back system 15 to establish the connection may include generating a call back message 220 to the call back system 15. The call back message 220 may include identification of the telephone number to which the call back system 15 is to establish a telephone connection and identifying the queue 16a, 16b and/or service agent group 12a, 12b to which the telephone connection is to be connected.

After the call back system 15 has established a connection with the communication device 11, it may generate a priority connection to the available service agent 12 within the appropriate service agent group 12a, 12b.

The priority connection 222 may be a transfer 222a of the communication device 11 connection to the primary queue 17. Transfer 222a may occur via a command such that the primary queue 17 connects the client to the next available one of the service agents 12 within the required service agent group 12a-12b (e.g., places the client at the front of the queue). The priority connection 222 may also be a connection 222b directly to the next available service agent 12, bypassing primary queue 17.

The secondary queue system 19 may comprise a secondary queue application 91 and a secondary queue table 93. The secondary queue table 93 maintains, for each communication device 11 being handled by the secondary queue component 19, call back information. In more detail, secondary queue table 93 may comprise a plurality of records 95. Each record 95 associates a client identifier 97 with a call back telephone number 101 (or other network identifier) to which a telephone connection may be established with the subject communication device 11, or other communication receiving device 50 at a connection time 103. Secondary queue table 93 may also include a service agent ID 99 identifying the service agent 120, or subset of the group of service agents to which the client 11 is to be connected.

In one aspect, the secondary queue application 91 monitors the passage of time and, upon determining that time has advanced to the connection time 103 of one of the records 95 of the secondary queue table 93, drives the call back system 15 to establish a telephony connection to the subject client. Again, the telephony connection may be a primary PSTN connection or a telephony connection using an alternative technology such as VoIP.

After establishing the telephony connection, the priority connection to a service agent 12 within the required service agent group is generated.

The expected wait time component 18 may be part of the secondary queue system 19, part of the primary queue (ACD) 17, or a separate accessory system interoperating with the secondary queue system 19 and the primary queue (ACD) 17.

Figure 5:
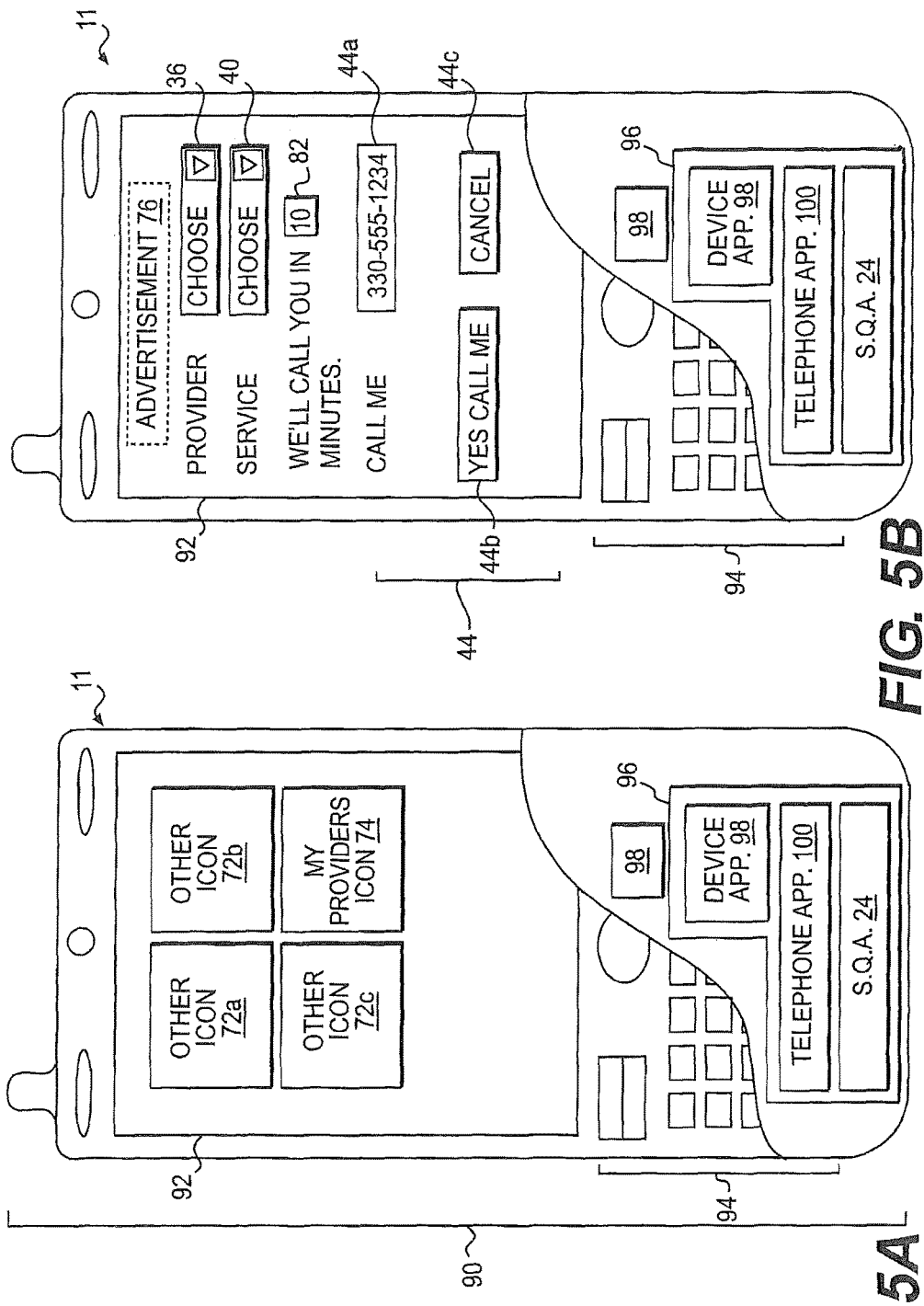
FIG. 5A is an exemplary communication device adapted for operation.
FIG. 5B is an exemplary communication device adapted for operation in accordance with an exemplary embodiment of the present invention.

Referring now to FIG. 5A, each device 11 may include user interface 90 inclusive of display screen 92 and controls 94 (such as keys, touch panel, or other controls) for operation of controls rendered on the display screen (keys are represented), memory 96, and processor 98 for executing applications encoded in the memory 96.

The applications encoded in memory 96 may include a telephone application 100, and/or appropriate systems adapted to drive operation of the user interface, and the session queuing component 24.

The telephone application 100 may be adapted to signal, establish, and maintain an audio communication session (either as the session initiator or receiver) with remote endpoint devices over compatible networks (PSTN, VoIP, and other networks utilized for audio communication sessions). The endpoint devices include the business communication center systems 14 for signaling, establishing, and maintaining audio communication sessions between each service agent 12 and the business clients, each of which may utilize one of the communication devices 11 for communication with the business.

The session queuing component 24 may include a launch object 74 rendered as a "My Providers" icon on the display screen 92 and adapted to launch operation of the session queuing component 24 upon detecting user selection of the launch object 74.

Referring now to FIG. 5B, for purposes of performing the above described functions, visible objects of the session queuing component 24 (following activation by selection of the launch icon 74 as depicted in FIG. 5A) include a provider control 36, a service control 40, and a confirmation control 44.

The confirmation control 44 may include a window 44a for confirming the identifier of a communication device 11 (i.e., the call back telephone number utilized to establish an inbound telephone call to the communication device 11 or other unique "call back" identifier used to establish an audio session with the communication device 11), an accept control object 44b and a cancel control object 44c.

In an exemplary embodiment, the telephone number of the communication device 11 may be pre-populated to the window object 44a with the window object being active to enable the user to modify the telephone number in the event he or she desires the call back to be at a different telephone station.

The cancel control object 44c may be a selection button adapted to detect user selection. Upon detecting user selection, cancel control object 44c may be adapted to terminate operation of the session queuing component.

The accept control object 44b may be a selection button adapted to launch the confirmation client 46 upon user selection.

Upon launch of the session queuing component 24 the visible objects of the session queuing component 24 may be rendered on the display screen 92 as depicted in FIG. 5B.

The provider control 36 may be rendered in an active state with the group of providers 78 (FIG. 6) populated into its drop down menu. From this menu, the user may select providers from the selected business communication center. The service control 40 is shown in an active state. The service control 40 and the confirmation control 44 may be rendered in an inactive state (i.e., rendered with no populated data, inoperable, and rendered with a gray tint to indicate the inactive state). In an embodiment, the provider client 34 (shown in FIG. 3B) populates the provider control 36 with a listing of the providers from the group of providers 78.

Figure 6:
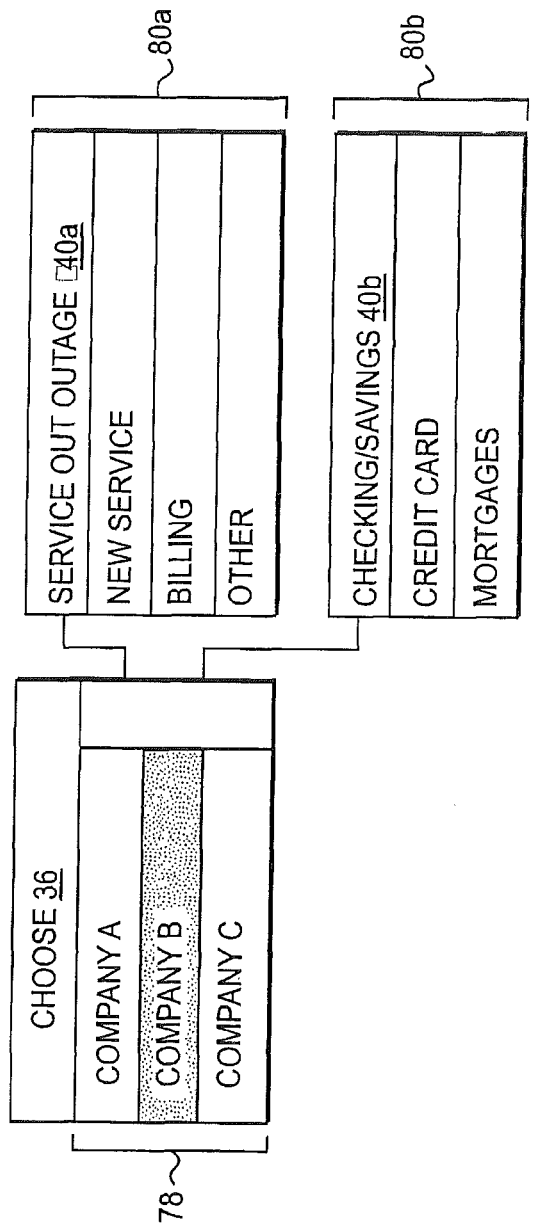
FIG. 6 is a table representing an exemplary provider control and an exemplary service control in accordance with an exemplary embodiment of the present invention.

Referring now to FIG. 6, shown is an illustration of the provider control 36. The provider control 36 may be a drop down menu control which displays a group of providers 78. From this menu, the user may select a provider from the selected business communication center.

The service control 40 may be a drop down menu control (as represented by 40a, 40b) which displays, for the selected provider, the services/queues of a group of services/queues 80a, 80b associated with the selected provider's business communication center. A user may select a service from this menu.

Exemplary providers include Company A and Company B. For purposes of illustration, Company A may be a utility company and its services/queues associated with its business communication center may include a service/queue for reporting loss of services, a service/queue for handling billing matters, and a default service/queue for handling other matters.

Company B, for illustration, may be a bank and its services/queues associated with its business communication center may include a service for handling of checking, savings, or other deposit accounts, a service for handling credit card accounts, a service for handling mortgage accounts, and a default service for handling other matters.

Figure 7A:
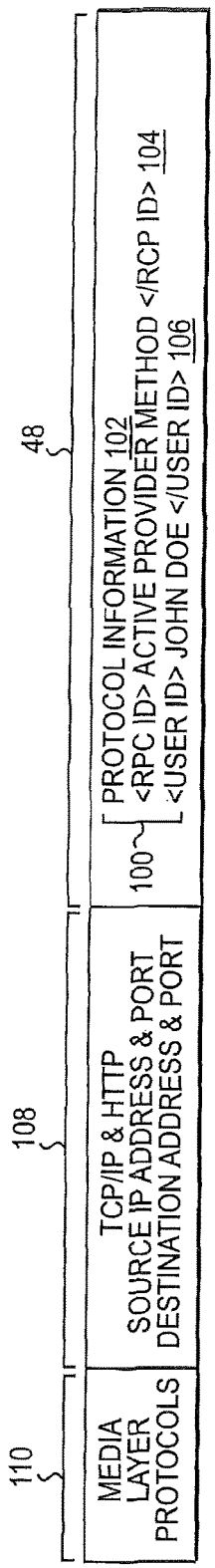
FIGS. 7A-7D represent exemplary messaging structures packaged with transport layer and media layer information.

FIG. 7A, shows an exemplary embodiment of a structure for communications or messages passing between the communication devices 11 and service providers. In this example, the structure of an active providers remote processing call 48 is shown. The structure may be an XML structure 100 with applicable SOAP or other remote processing call protocol information 102. The exemplary structure includes at least a method identifier 104, which identifies the active provider routine or process 26 as the remote process, and data arguments 106 for the active provider routine 26. The data arguments 106 may include at least identification of the user.

The remote processing call 48 may be encapsulated within appropriate TCP/IP and HTTP headers and other transport layer information 108 such as source IP address and source port number of the requesting device 11 and destination IP address and destination port number of the sequence component 22. Such combination may be encapsulated within appropriate media layer protocols 110 for transmission across physical communication media via various physical layer segments interconnecting the requesting device 11 and the sequence component 22.

Figure 7B:
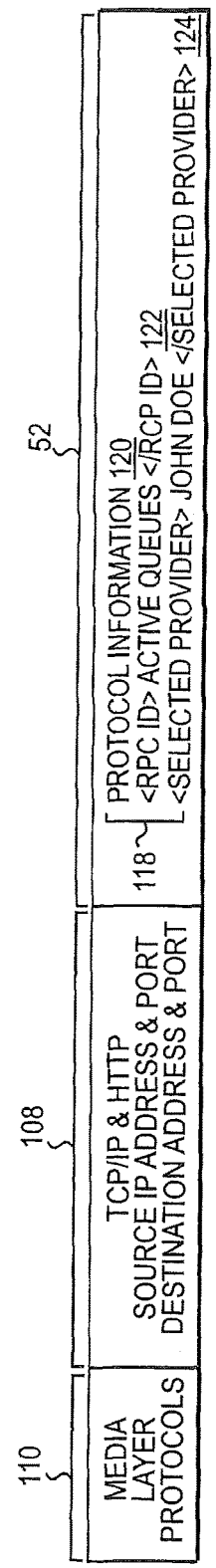
Figure 7C:
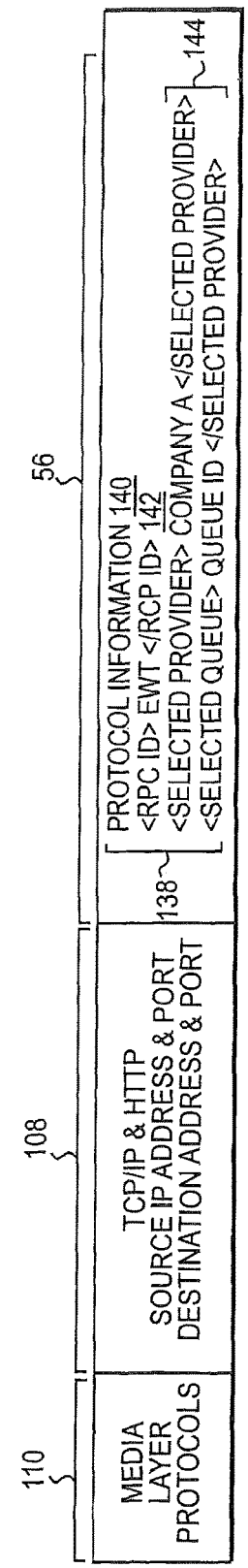
Figure 7D:
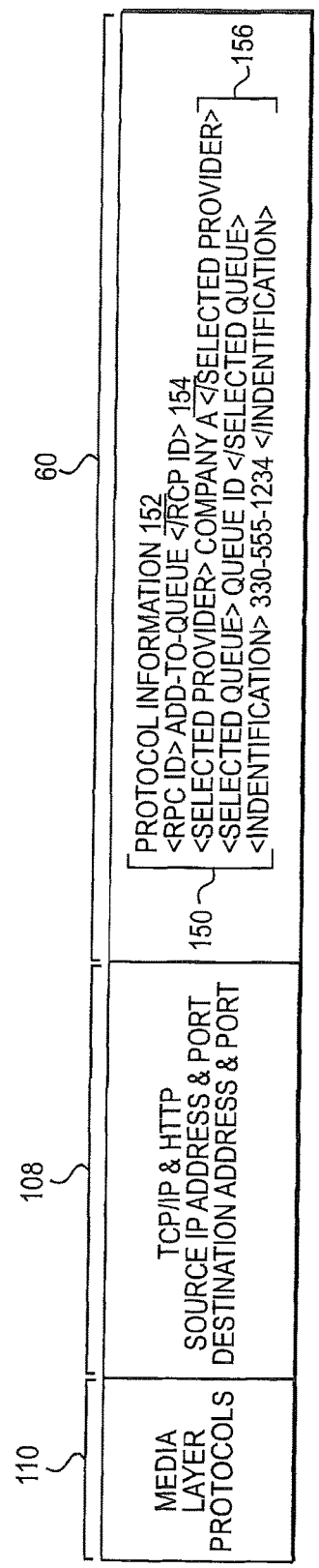

FIGS. 7B-7D show exemplary structures of other messages or communications within system 10 similar to that of active providers remote processing call 48. The other communications that may be similarly structured, encapsulated, and transported may include the active queue remote processing call 52 (FIG. 7B), expected wait time call 56 (FIG. 7C), add-to-queue remote processing call 154, the active providers message 50, the active queue message 54, the expected wait time message 58, and the confirmation remote processing call 60 (FIG. 7D), for example.

More specifically, referring to FIG. 8A and FIG. 8B, the active provider routine 26 includes a looking up (at step 112) in an active providers data store 200, a list of active providers associated with the user. The active providers data store 200 and may include a group of records 202, with each record associating a user ID 204 with identification of a group of active providers 202 associated with the user ID 204. Step 114 represents building an active providers message 50 (shown in FIG. 3A) for return to the device generating the active providers remote processing call 48 (shown in FIG. 3A).

It should be appreciated that the above described structure and processes for populating the provider control 36 is exemplary only. Those skilled in the art will also recognize that the list of providers could be obtained and stored within the communication device 11. A list of providers stored within the communication device 11 may then be used for populating both the provider control 36 and the active queue control 40. Upon a user selecting a provider from the list of active providers 78 rendered or shown within the provider control, the service client routine 38 requests a listing of active queues from the active queue routine or process 28 of the sequence component 22. The service client routine 38 populates the service control 40 with a listing of active queues associated with the selected provider.

More specifically, referring to FIG. 8C and FIG. 8D, the active queue routine or process 28 includes looking up (at step 126) in an active queues data store 208, a list of active queues associated with the selected provider. The active queues data store 208 may include a group of records 210, with each record associating a company ID 212 (identifying a provider) with identification of a group of active queues 214 associated with the company ID 212. The build active queues list (step 128) represents building an active queues message 54 (described above) for return to the device generating the active queue remote processing call 52 (described above).

Upon receipt of the active queues message 54, by service client routine 38, the service control 40 is populated by the list of active queues 80*a* as discussed with respect to FIG. 5B and FIG. 6.

It should be appreciated that the above described structure and processes for populating the service control 40 is exemplary only. Those skilled in the art will also recognize that lists of active queues for each provider could be obtained and stored within the communication device 11 utilizing one or more remote processing calls prior to user selection. As such, list of providers and active queues stored within the communication device 11 may then be used to populate both the provider control 36 and the active queue control 40. It is further envisioned that both the provider control 36 and the service control 40 may be combined within a single control listing combinations of a provider and a service.

More specifically, referring to FIG. 8E, the expected wait time routine or process 30 includes obtaining (at step 134) from the expected wait time component 18 associated with the selected queue of the selected provider, the expected wait time for the selected queue. Such step may include sending a remote processing call to the expected wait time component with data arguments (of the remote processing call) including identification of the selected queue. The return expected wait time to calling device (step 136) represents the expected wait time component 18 building an expected wait time message 58. The expected wait time message can then be sent to the device generating the expected wait time remote processing call 56.

Referring back to FIG. 5B, upon receipt of the expected wait time response message 58, the expected wait time value 148 identifying the expected wait time duration of time is rendered on the display screen as depicted by reference numeral 82. Following display of the identification of the duration of time, the confirmation control 44 may be activated for obtaining user input.

As discussed, the confirmation control may include a window 44*a* for confirming a telephone number of the communication device 11 or the communication receiving device 50 (i.e., the telephone number utilized to establish an inbound telephone call to the communication device 11 or the communication receiving device 50), a confirmation control 44*b* and a cancel control 44*c*.

In an exemplary embodiment, the telephone number of the communication device 11 may be pre-populated to the window object 44*a* with the window object being active to enable the user to modify the telephone number in the event he or she desires the call back to be at a different telephone station, such as the communication receiving device 50.

The cancel control 44*c* may be a selection button adapted to detect user selection. Upon detecting user selection, the cancel control object may be adapted to terminate operation of the session queuing component.

The accept control object 44*b* may be a selection button adapted to launch the confirmation client 46 upon user selection.

The confirmation client 46 (shown in FIG. 3A) may be adapted to send a confirmation remote processing call 60 to the sequence component 22 via the message structure described above. In this instance, the data arguments may include at least the identification of a telephone number or other telephone network address of the communication receiving device 50 or communication device 11 that the user desires for use in the connection to the service agent. Typically such identification will be a PSTN telephone number that the provider systems will use as a "call back number" to establish a telephone connection between the user and a service agent at the appropriate call back time.

Further, the arguments of the confirmation remote processing call may include identification of the selected provider and selected queue which the user desires to join. Alternatively, the arguments may include a session ID matched to previous remote processing calls such that the sequence component may determine the selected provider and selected queue which the user desires to join.

More specifically, referring to FIG. 8F, the confirmation routine or process 32 includes (at step 216) generating an add-to-queue instruction 217. The instruction may include for example, a queue ID of the selected queue and the call back number (e.g., the telephone network identifier of the communication receiving device 50) in a format compatible for transmission to the selected business communication center's systems. The step 218 of passing the add-to-queue instruction 217 to the queue component 20 of the selected provider is shown in FIG. 8F. This step includes packaging the SOAP formatted add-to-queue instruction with applicable transport layer and media layer for transmission as discussed above. Upon receipt, the queue component 20 of the selected provider may add the user to the selected queue.

Figure 9:
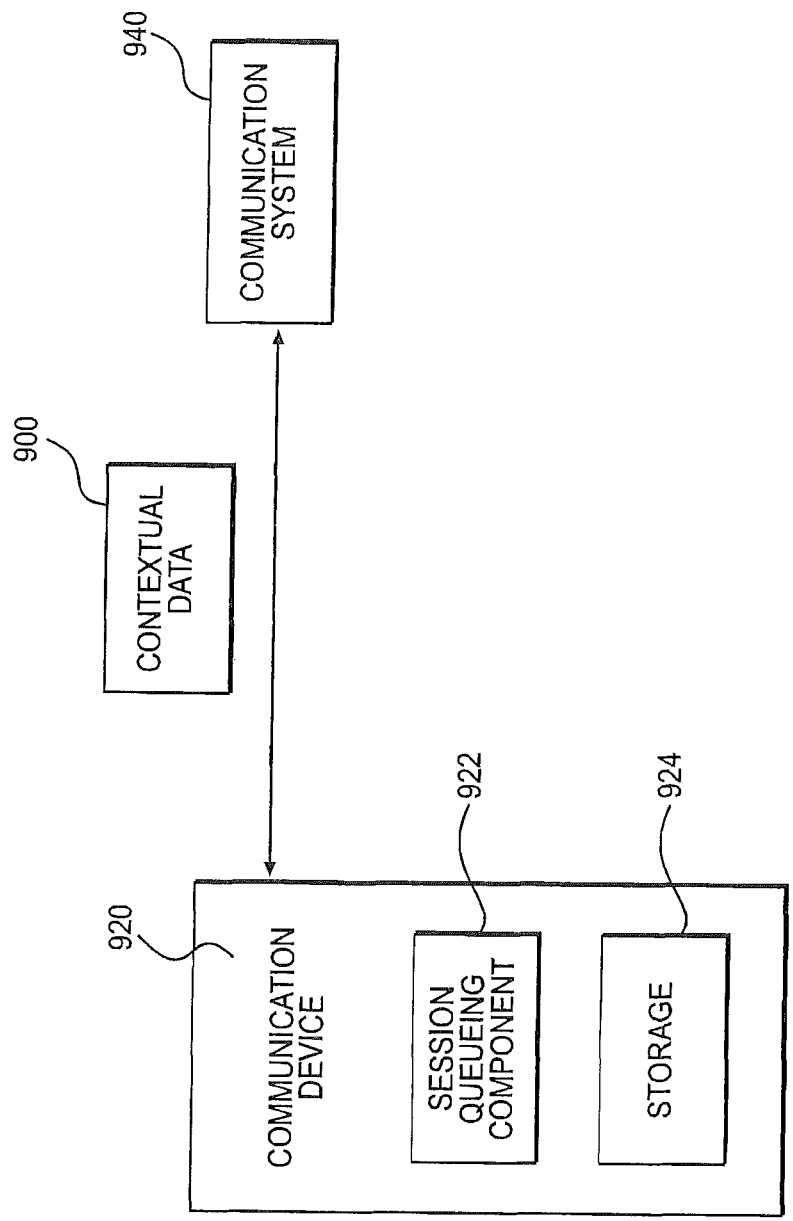
FIG. 9 illustrates an embodiment of the system that communicates contextual data between a communication device and a communication system.

Referring to FIG. 9, in addition to requesting an expected wait time and callback from the communication system, an embodiment of a system and method for managing, directing, and queuing communication events may also communicate contextual data 900 between a communication device 920 (which includes a session queuing component 922) and a communication system 940 using, for example, a contextual data routine. The contextual data 900 may be sent to the communication system 940 by itself or along with a callback request. The contextual data 900 can be stored in a storage 924 and can include any information associated with the user of the communication device, such as name, phone number, address, account number, unique identifier, id number or unique identifier for phone, id number or unique identifier for a car or vehicle, credit score, products and services owned/used, purchase history, GPS or location information, demographics, personal data such as height, weight, shirt size, waist size, shoe size, current medications, etc. The storage 924 can be any memory means, including a memory, such as RAM, ROM or similar types of memory, as well as secondary storage devices, such as a hard disk drive, floppy disk drive, CD-ROM drive, or other types of non-volatile data storage. The contextual data 900 associated with the user can also include for example data about a process, installation or instructions set for example which steps or parts of self-service/technical support steps were performed/completed/not completed, which steps of an installation were completed, or which portion of an instructional manual or process were completed. Also, data about a device or vehicle can be sent as contextual data 900 about or from, for example, a kiosk, point of sale device, airplane ticket machine, automobile, cell phone, etc.

In some embodiments, contextual data 900 is encrypted prior to transmission. For example, various methods of encryption may be used when transmitting contextual data from the user device to a central location or system.

The contextual data 900 of a user that is sent from the communication device 920 or other device to the communication system 940 may allow the communication system 940 to dynamically select a proper list of providers and/or queues that are specific, pertinent, and relevant to the user. As a result, only relevant and pertinent lists of providers and/or queues are displayed to the user. Other providers and queues that are not relevant based on the contextual data 900 are filtered out.

In some embodiments, contextual data 900 is used for authentication. Use of contextual data may also allow the communication system 940 to bypass authentication processes, thus shortening the total interaction time. Systems can either assume that the caller on the communication device 920 is the owner of the device and thus authenticate using device information (such as ID number of the like) or data about a user resident on the device. Alternatively, a system with contextual data capability can present a shortened number of questions or queries for biographical or biometric data for authentication of the current user. For example, contextual data 900 can contain key information about a user of a device which can be used to authenticate the user or the device when a call (or connection) is made from the device. Contextual data 900 may contain one or more phone numbers, pin codes, name, personal identification, personal biographical data or biodata, personal biometric data (e.g. voice print, fingerprint, handprint, iris scan, or the like), credit card number and/or passwords that can be used to authenticate the user.

In some embodiments, for authentication, a user is requested to enter or submit biometric data such as voice, fingerprint, handprint, iris info, etc. Ancillary equipment may be used to obtain the biometrics (such as a fingerprint reader or scanner). This biometric data is transmitted as contextual data 900 to a central system for authentication. The central system compares the received biometric with that on file or in storage. The comparison is used to authenticate the user and provide customized, personalized and/or targeted services.

In an alternative embodiment, personal contextual data 900 is stored on the phone but locked, that is access and the ability to transmit this contextual data 900 from the phone to other devices is available only to a particular user. Contextual data 900 may be stored in encrypted format and only decrypted after it is "unlocked" or proper security measures are cleared. The contextual data 900 can be released from lock-down by various security means or measures such as pin number, personal identification, biometrics and/or password. In one embodiment, the security measure used to release the contextual data from lock down is voice print or voice identification. For example, the user speaks into the device for authentication. More specifically, the words to be spoken may be selected by the device from among a database of voice samples saved for this security purpose. After a voice sample is obtained from the current device user a comparison is made. If a voice match is found, the contextual data 900 is unlocked from the security measures and may be released for use and transmission. If the security measures are not met, the contextual data 900 remains locked and unavailable to the person in possession of the communication device 920. The contextual data 900 unlocked by voice matching or identification may be transmitted encrypted or unencrypted to a central location or system for use.

In addition, the contextual data 900 of a user/customer may be sent from the communication device 920 or other device to an agent or representative connected to the communication system 940 so that the agent or representative can better assist the user/customer. The contextual data may be maintained or stored in a database in memory for later use.

As also described elsewhere, contextual data 900 flows from the communication device 920 to a communication system 940 as well as from the communication system 940 to the communication device 920. In certain instances, it may be useful to transmit the contextual data 900 from either the communication device 920 or communication system 940 to a third location. Questions and queries of the user may be sent from the communication system 940 to the communication device 920. Contextual data 900 to assist, instruct or solve a users problem may also be sent from the communication system 940 or a third location to the communication device 920 for use by the user or communication device 920.

In one embodiment involving an automobile, the contextual data 900 is used by a caller in an automobile to schedule an appointment for service and repair. The driver/owner of the automobile has a car problem and wishes to speak with the appropriate individual to trouble shoot and advise the driver on steps to be taken. The driver uses a communication device 920 to make contact over the interne to obtain a list of queues and availability. Contextual data 900 about the automobile is received by the central queue location for proper evaluation of the drivers needs. This contextual data 900 may be obtained directly from the automobile through a communication system 940 with the automobile or may be obtained through the communication device 920. The communication device 920 may communicate directly to or through the automobile or obtain the automobile information through other means such as from the driver. The central communication system 940 uses the contextual data 900 from the car to decide whether the car problem is immediate, urgent or can be addressed through a regularly scheduled visit. With this information, the driver can be provided with the proper queue data. The queue data will provide the estimated wait time or can help schedule a callback time. In the appropriate circumstances, the queue presented to the driver may be for an emergency person or a mechanic. In certain circumstances, an immediate callback may occur.

In another embodiment involving an airline ticket machine, the user needs assistance with a travel problem and has used an airline ticket machine. In this circumstance, when the user requests the queue information, the information about the transaction or attempted transaction at the airline ticket machine is passed to the central location, e.g., communication system 940, as contextual data 900. This data may be transferred in several ways, for example the user can enter an ID number from the airline ticket machine and the central location, using data about the user and the identity of the machine, obtains transaction or attempted transaction information through a look-up of stored data or directly from the machine. The information obtained from the airline ticket machine is then used to determine the appropriate queue and employee to assist the passenger. More specifically, if the user is attempting to change seats one queue or attendant may be most appropriate while if the user was attempting to upgrade to first class a different queue or attendant may be provided. If a flight is full and no seat is being assigned, yet another queue or attendant may be assigned to the passenger.

In another embodiment, a purchaser is calling to place a regular order, such as a monthly prescription order or a monthly supplies order. With contextual data 900 on the purchaser, the central system, e.g., communication system 940, will determine whether the call appears to be related to a regular standing order and if so make available for listing the appropriate renewal of order queue. When the attendant is on the telephone, all the regular order information will be available to the attendant to speed the process of filling the purchasers anticipated request. Even if another queue is selected by the purchaser, such as trouble shooting, the attendant will have the contextual data 900 available so that the attendant will be aware of he purchasers usual shopping pattern and have some background information available.

In another embodiment involving repair or trouble shooting processes, the contextual data 900 relates to the state or steps in the process that have been completed or attempted. This data can be obtained from the user or directly from the device. It may be obtained from the user through the queue selection interface or from the device through a communication connection such as the internet. Similarly, in an assembly process, contextual data about the serial number of the item and the portions of the item that have been assembled by the user may be sent as contextual data 900, either by the user or directly through available communications with the device.

Various types of contextual data 900 may be sent from the communication system 940 to the communication device 920. The data may be related to various administrative, customer accounts, authentication, ordering, accounting, billing, customer equipment, trouble shooting, and customer service issues. Contextual data 900 sent by the communication system 940 may include for example requests for data or information, request for equipment identification information, equipment schematics, equipment parts information, warranty information such as expiration date, instructions, assembly steps, billing information such as payment history, minimum payment date, and last payment date and/or amount, payment methods available, and the like. Various interactions between the communication device 920 and communication system 940 may occur using contextual data. Various interactions with a third location may occur. Various ways of using contextual data a900 re possible, only a few examples are shown.

Figure 10:
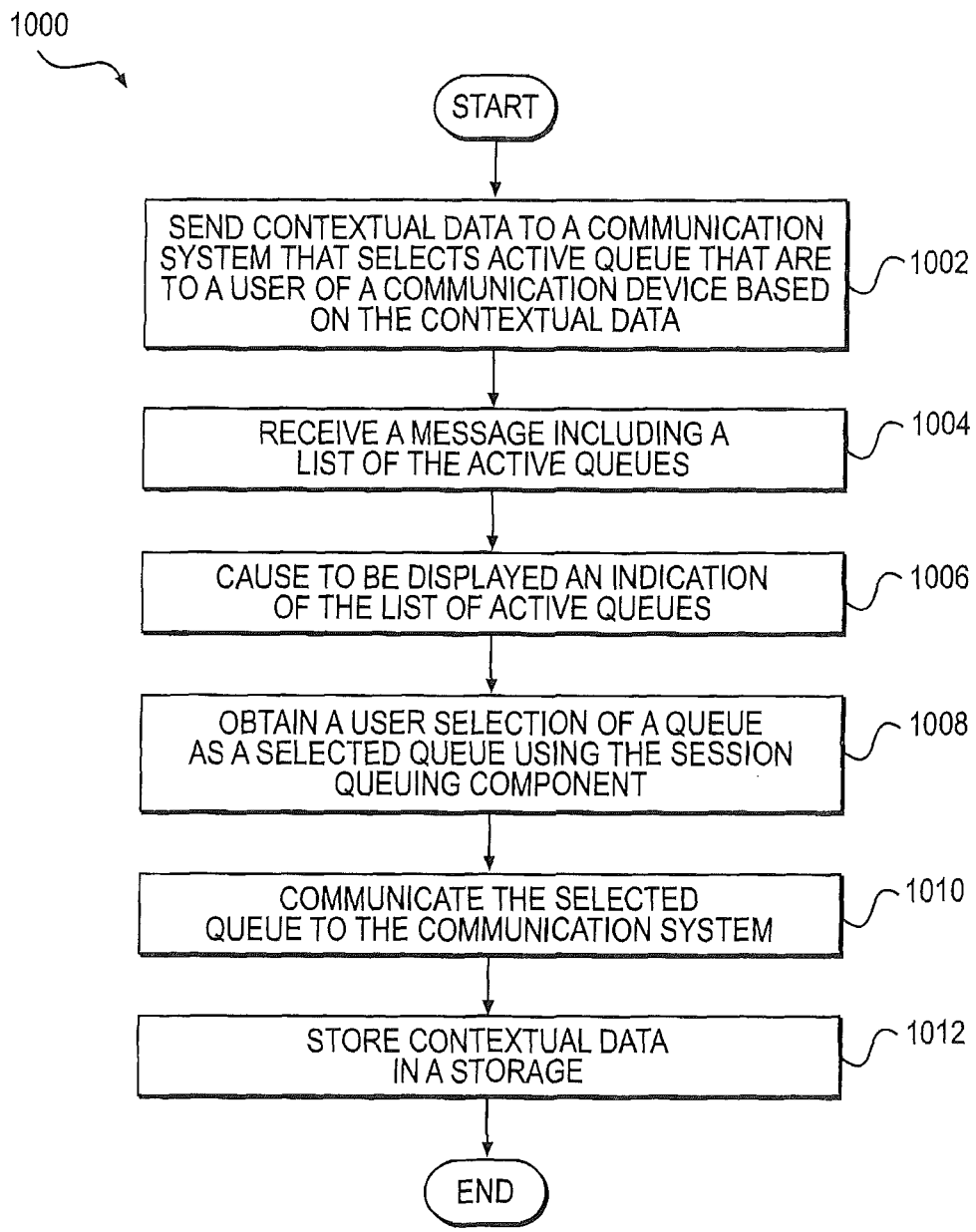
FIG. 10 is a flow chart illustrating an embodiment of a method for use with a communication device for initiating a call-back for selecting a voice call-back.

FIG. 10 is a flow chart illustrating an embodiment of a method 1000 for use with a communication device for selecting a voice call-back. Method 1000 includes sending contextual data to a communication system that selects active queues that are relevant to a user of the communication device based on the contextual data (block 1002). The contextual data may be created in real-time or recalled from storage. Method 1000 further includes receiving a message including a list of the active queues (block 1004), causing to be displayed an indication of the list of active queues (block 1006), obtaining a user selection of a queue as a selected queue using the session queuing component (block 1008), and communicating the selected queue to the communication system (block 1010). Method 1000 further includes storing the contextual data in a storage (block 1012). The contextual data in storage can be newly written, updated with new information or rewritten after a communication transaction or telephone call.

Figure 11:
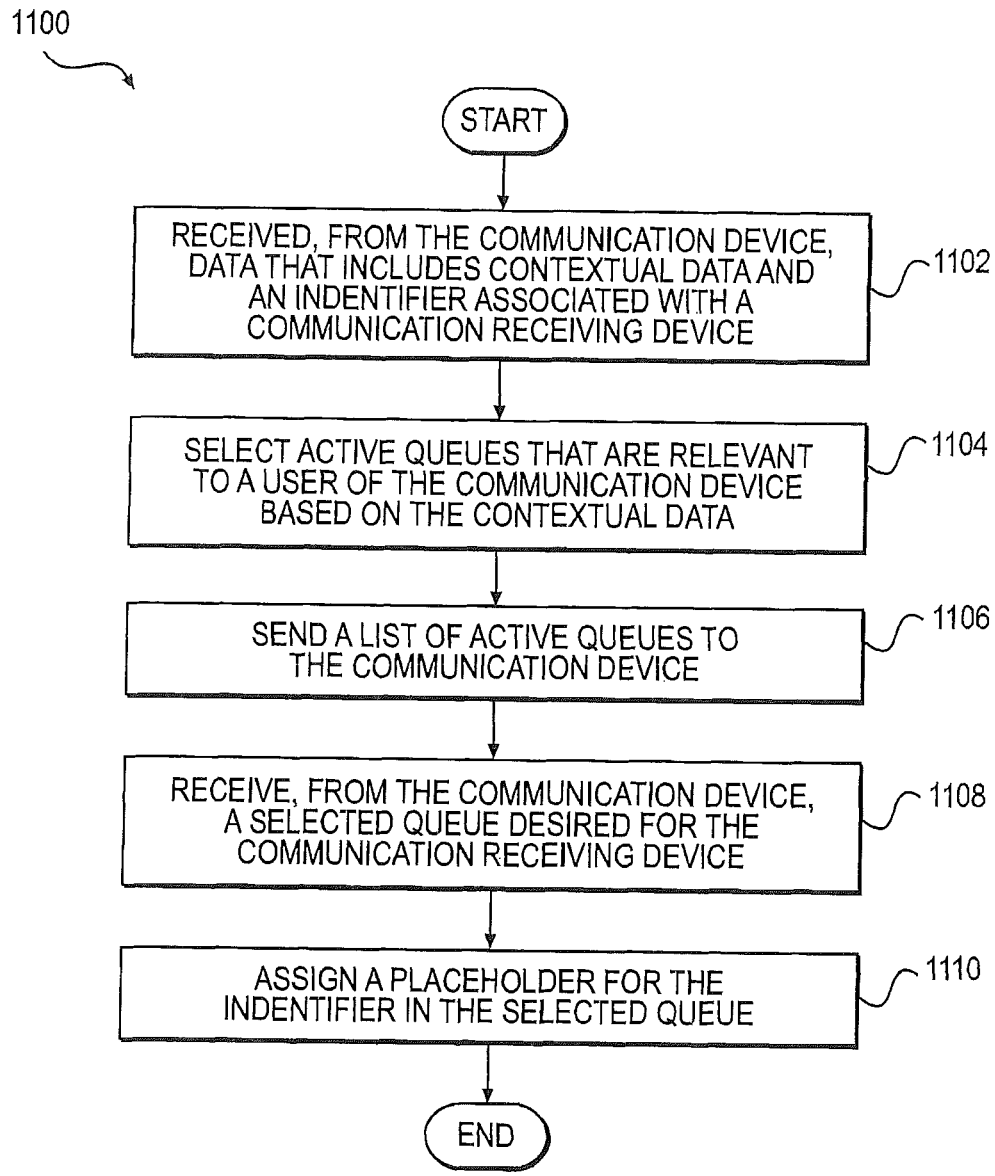
FIG. 11 is a flow chart illustrating an embodiment of a method for a communication system that receives incoming communications from a communication device, has queues, and will call-back to a communication receiving device.

FIG. 11 is a flow chart illustrating an embodiment of a method 1100 for a communication system that receives incoming communications from a communication device, has queues, and will call-back to a communication receiving device. Method 1100 includes receiving, from the communication device, data that includes contextual data and an identifier associated with a communication receiving device (block 1102), and selecting active queues that are relevant to a user of the communication device based on the contextual data (block 1104). Method 1100 further includes sending a list of active queues to the communication device (block 1106), receiving, from the communication device, a selected queue desired for the communication receiving device (block 1108), and assigning a placeholder for the identifier in the selected queue (block 1110).

Figure 12:
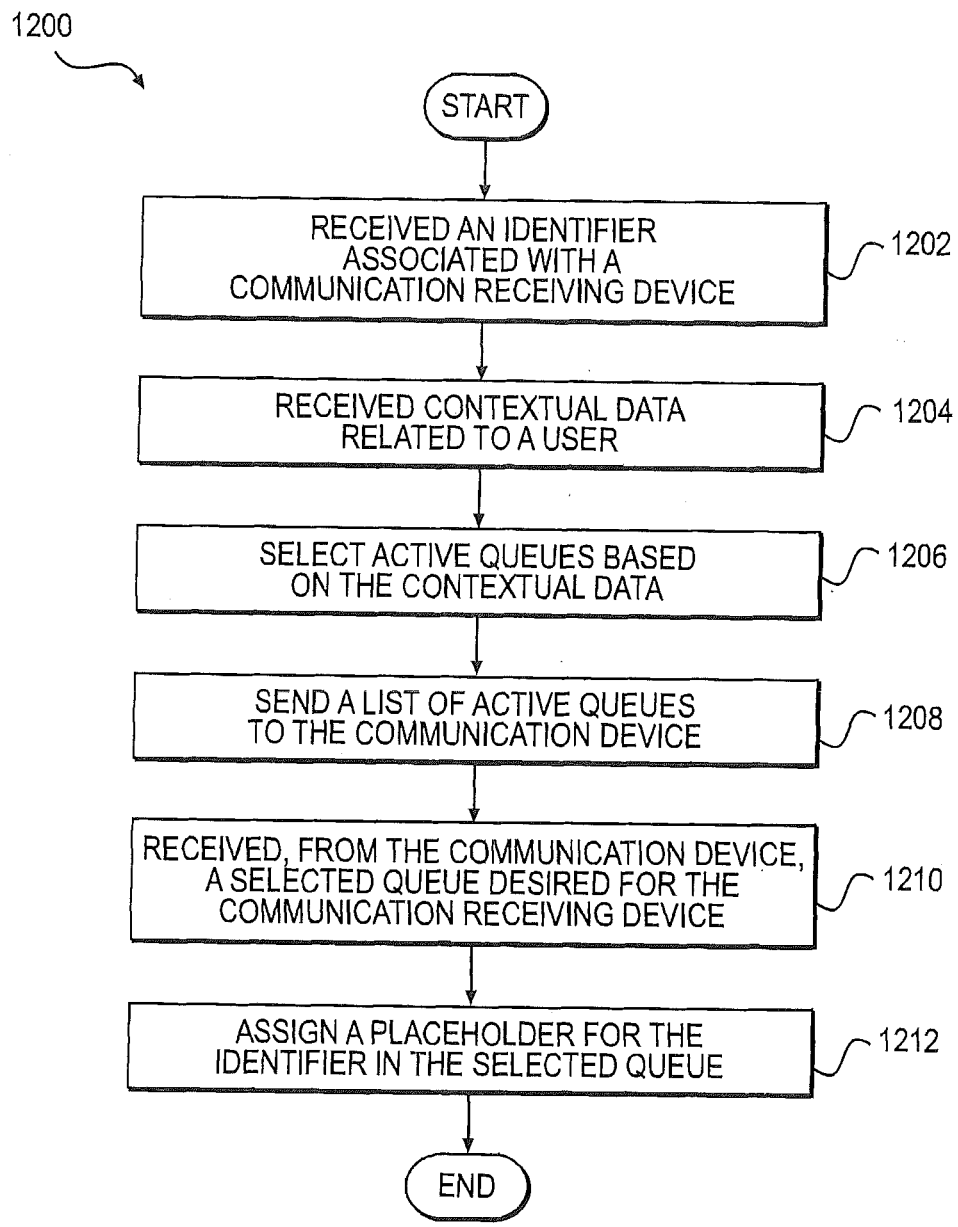
FIG. 12 is a flow chart illustrating another embodiment of a method for a communication system that receives incoming communications from a communication device, has queues, and will call-back to a communication receiving device.

FIG. 12 is a flow chart illustrating an embodiment of a method 1200 for a communication system that receives incoming communications from a communication device, has queues, and will call-back to a communication receiving device. Method 1200 includes receiving an identifier associated with a communication receiving device (block 1202), receiving contextual data related to a user (block 1204), and selecting active queues based on the contextual data (block 1206). Method 1200 further includes sending a list of active queues to the communication device (block 1208), receiving, from the communication device, a selected queue desired for the communication receiving device (block 1210), and assigning a placeholder for the identifier in the selected queue (block 1212).

The above described system represents an exemplary embodiment of a connection system for sequencing communication device identifiers in a selected queue for connection to a service agent of a group of service agents at a business communication center. The present invention includes all such equivalents and modifications, and is limited only by the scope of the following claims.

The invention claimed is:

1. A method for a communication system that receives incoming communications from a communication device having a session queuing component, wherein the communication system has queues and will call-back to a communication receiving device, the method comprising:
   receiving, from the communication device, wherein the data includes an identifier associated with the communication receiving device and contextual data corresponding to at least one of the communication device and a user of the communication device;
   sending a list of a plurality of active providers and an indication of a list of active queues associated with at least one of the plurality of active providers to the communication device for use in a display;
   receiving, from the communication device, a desired queue for the identifier;
   assigning a placeholder for the identifier in the desired queue;
   when a call back request is received from the communication device, initiating a call back to the communication receiving device using the assigned placeholder in the desired queue; and
   placing an outgoing telephone call to the communication receiving device.

2. The method of claim 1, wherein the communication device is one of a home entertainment device, a kiosk, and a point of purchase device.

3. The method of claim 1, wherein the communication device is a home entertainment device, and wherein the home entertainment device is one or more of a set top box, a television, a cable box, a gaming console, and a digital video disk (DVD) player.

4. The method of claim 1, wherein one device is both the communication device and the communication receiving device.

5. The method of claim 1, further comprising:
   performing a security check of the communication receiving device, wherein the identifier is encrypted.

6. The method, of claim 1, further comprising:
   determining one or more queues in the list of active queues based on the contextual data.

7. A non-transitory computer-readable medium including computer-executable instructions for initiating a call-back sequence, said instructions configuring a communication system to:
   receive, from a communication device having a session queuing component, an identifier associated with a communication receiving device and contextual data corresponding to at least one of the communication device and a user of the communication device;
   send a list of a plurality of active providers and an indication of a list of active queues associated with at least one of the plurality of active providers to the communication device;
   receive a desired queue for the identifier;
   assign a placeholder for the identifier for the desired queue; and
   when a call back request is received from the communication device, initiate a call back to the communication receiving device using the assigned placeholder for the desired queue.

8. The non-transitory computer readable medium of claim 7, wherein the communication device is one of a home entertainment device, a kiosk, and a point of purchase device.

9. The non-transitory computer readable medium of claim 7, wherein the communication device is a home entertainment device, and wherein the home entertainment device is one or more of a set top box, a television, a cable box, a gaming console, and a digital video disk (DVD) player.

10. A communication device for initiating a voice call-back comprising:
    a display screen;
    a processor configured to execute a device application, wherein the device application comprises:
    a contextual data routine that communicates contextual data to and from a communication system, wherein the contextual data is relevant to an identification of active queues by the communication system;
    a routine that receives from the communication system in a data format an identification of active queues associated with at least one of a plurality of active providers;
    a session queuing component that indicates one or more of the active queues and obtains a selection of one of the active queues; and
    a routine that communicates the identity of the selected queue to the communication system.

11. The communication device of claim 10, further comprising a storage device wherein the contextual data is stored.

12. The communication device of claim 10, wherein the contextual data is sent to the communication system with a callback request and includes one or more of a name, a phone number, an address, an account number, and a unique identifier.

13. The communication device of claim 10, wherein the contextual data includes data for authentication.

14. The communication device of claim 10, wherein the contextual data contains information about a user of a device and is used for authentication of the device.

15. A method for use with a communication device for selecting a voice call-back, the method comprising:
    sending contextual data to a communication system, wherein the contextual data is relevant to an identification of active queues by the communication system;
    receiving a message including a list of active queues associated with at least one of a plurality of active providers;
    causing to be displayed an indication of at least a portion of the plurality of active providers and an indication of the list of active queues;
    obtaining a user selection of a queue as a selected queue using a session queuing component located on the communication device; and
    communicating the selected queue to the communication system.

16. The method of claim 15, further comprising storing the contextual data.

17. The method of claim 15, wherein the contextual data contains information about a user of a device, and the method further comprising authenticating the device using the contextual data.

18. A non-transitory computer readable medium for storing computer executable instructions for initiating a call-back from a communication device, the computer executable instructions comprising:

sending contextual data to a communication system, wherein the contextual data is relevant to an identification of active queues by the communication system;

receiving a message including a list of active queues associated with at least one of a plurality of active providers;

causing to be displayed an indication of at least a portion of the plurality of active providers and an indication of the list of active queues;

obtaining a user selection of a queue as a selected queue using a session queuing component; and communicating the selected queue to the communication system.

19. A method for a communication system that receives incoming communications from a communication device, has queues, and will call-back to a communication receiving device, the method comprising:

receiving, from the communication device, an identifier associated with a communication receiving device and contextual data corresponding to at least one of the communication device and a user of the communication device;

determining active queues that are relevant to a user of the communication device based on the contextual data;

sending a list of active queues associated with at least one of a plurality of active providers to the communication device;

receiving, from the communication device, a selected queue desired for the communication receiving device; and assigning a placeholder for the identifier in the selected queue.

20. The method of claim 19, further comprising
determining an expected wait time in the selected queue; and sending the expected wait time to the communication device.

21. A non-transitory computer-readable medium including computer-executable instructions for initiating a call sequence, said instructions configuring a communication system to:

receive, from a communication device, an identifier associated with a communication receiving device and contextual data corresponding to at least one of the communication device and a user of the communication device;

determine active queues that are relevant to a user of the communication device based on the contextual data;

sending a list of active queues associated with at least one of a plurality of active providers to the communication device;

receive, from the communication device, a selected queue desired for the communication receiving device; and assign a placeholder for the identifier in the selected queue for a call.

22. The non-transitory computer-readable medium of claim 21 wherein the contextual data is used to define one or more of the plurality of active providers and wherein the active queues are determined from the defined active providers.

23. The non-transitory computer-readable medium of claim 21 wherein said instructions further configure a communication system to:

ascertain an expected wait time for the selected queue; and send the expected wait time to the communication device.

24. The method of claim 1 further comprising: determining the list of the plurality of active providers to send using the received contextual data.

* * * * *